(12) United States Patent
Shinozaki

(10) Patent No.: US 7,881,719 B2
(45) Date of Patent: Feb. 1, 2011

(54) TELECOMMUNICATION SYSTEM AND TRANSMISSION METHOD

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 11/896,991

(22) Filed: Sep. 7, 2007

(65) Prior Publication Data

US 2008/0051123 A1    Feb. 28, 2008

Related U.S. Application Data

(63) Continuation of application No. PCT/JP2005/004133, filed on Mar. 9, 2005.

(51) Int. Cl.
*H04W 36/00* (2009.01)

(52) U.S. Cl. ............ 455/442; 455/67.13; 370/332

(58) Field of Classification Search ......... 455/436–444, 455/67.11, 67.13; 370/331–335, 342
See application file for complete search history.

(56) References Cited

U.S. PATENT DOCUMENTS

| | | | |
|---|---|---|---|
| 5,978,365 A | 11/1999 | Yi | |
| 6,134,237 A | 10/2000 | Brailean et al. | |
| 6,141,555 A | 10/2000 | Sato | |
| 6,615,381 B1* | 9/2003 | Nohara et al. | ......... 714/746 |
| 6,628,631 B1* | 9/2003 | Mazawa et al. | ......... 370/331 |
| 7,274,912 B2 | 9/2007 | Sommer | |
| 7,454,210 B2* | 11/2008 | Rinne et al. | ......... 455/442 |
| 2003/0040283 A1 | 2/2003 | Kawai et al. | |
| 2003/0148781 A1 | 8/2003 | Sommer | |
| 2003/0169709 A1* | 9/2003 | Oki | ......... 370/335 |
| 2004/0071105 A1 | 4/2004 | Maeda et al. | |
| 2004/0229617 A1 | 11/2004 | Sato | |

FOREIGN PATENT DOCUMENTS

| | | |
|---|---|---|
| CN | 1290437 A | 4/2001 |
| CN | 1297626 A | 5/2001 |
| CN | 1402442 A | 3/2003 |
| CN | 1444806 A | 9/2003 |
| EP | 1083679 A1 | 3/2001 |
| JP | A-05-35634 | 2/1993 |
| JP | A-H11-69416 | 3/1999 |

(Continued)

OTHER PUBLICATIONS

Notice of Rejection Ground dated Jan. 26, 2010 received in the corresponding Japanese Patent Application No. 2007-506955.

(Continued)

*Primary Examiner*—Raymond S Dean
(74) *Attorney, Agent, or Firm*—Fujitsu Patent Center

(57) ABSTRACT

At the time of carrying out a DHO, a DHO execution unit encodes data to be transmitted and interleaves it, followed by dividing it into segment data and sending out from respective transmission paths. When receiving data, the unit receives pieces of segment data from the respective transmission paths, combines them together, de-interleaves them and receives data by decoding it. When dividing into segment data, it allocates segment data with larger amount of data to a transmission path with a high transmission quality, and that with smaller amount of data to a transmission path with a low transmission quality, in accordance with the transmission quality.

20 Claims, 29 Drawing Sheets

FOREIGN PATENT DOCUMENTS

| | | |
|---|---|---|
| JP | A-2000-217139 | 8/2000 |
| JP | A-2003-503863 | 1/2003 |
| JP | A-2003-60562 | 2/2003 |
| JP | 2003111134 | 4/2003 |
| JP | A-2003-111134 | 4/2003 |
| JP | A-2004-134978 | 4/2004 |
| KR | 0133508 | 4/1998 |
| WO | 2004040798 A1 | 5/2004 |

OTHER PUBLICATIONS

Notice of Preliminary Rejection dated Dec. 31, 2009 issued by the Korean Intellectual Property Office in the corresponding Korean Patent Application No. 10-2007-7022102.

Text of the First Notice of Rejection Ground Office Action for the corresponding Chinese Patent Application No. 200580049001.4 dated Mar. 11, 2010.

* cited by examiner

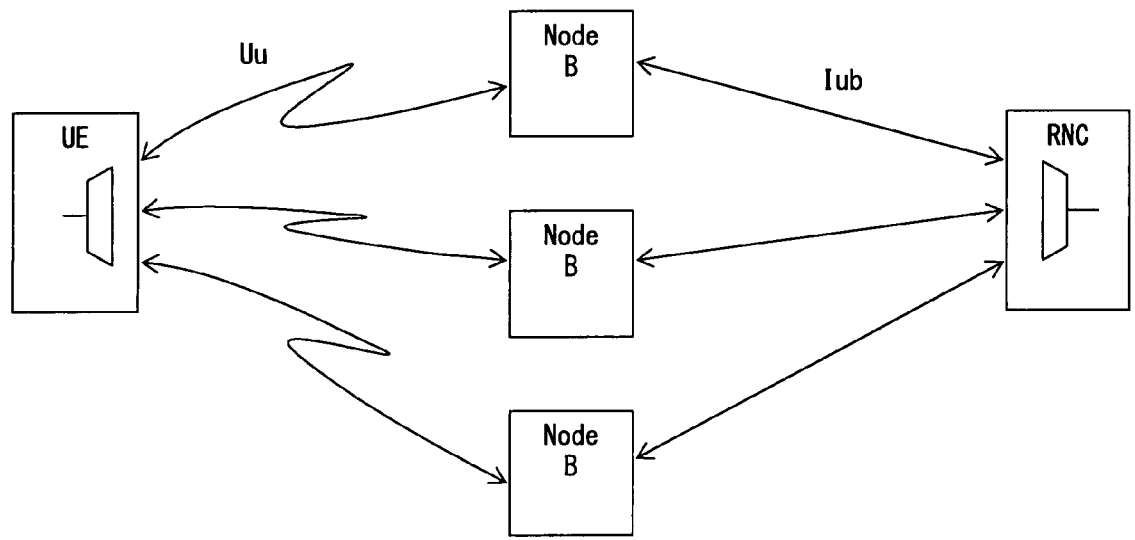
F I G. 1

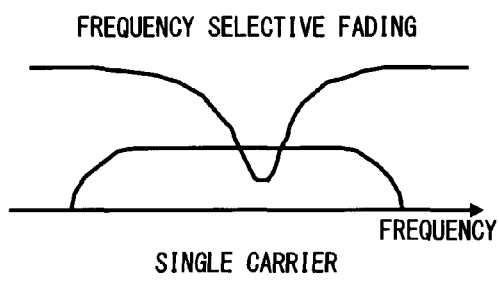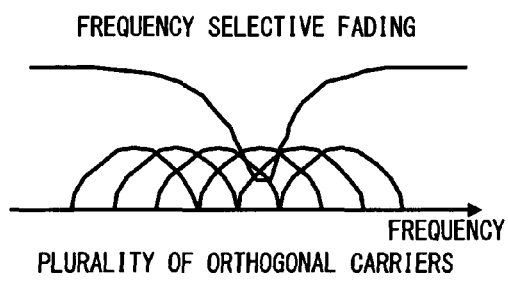
F I G. 4 A    F I G. 4 B

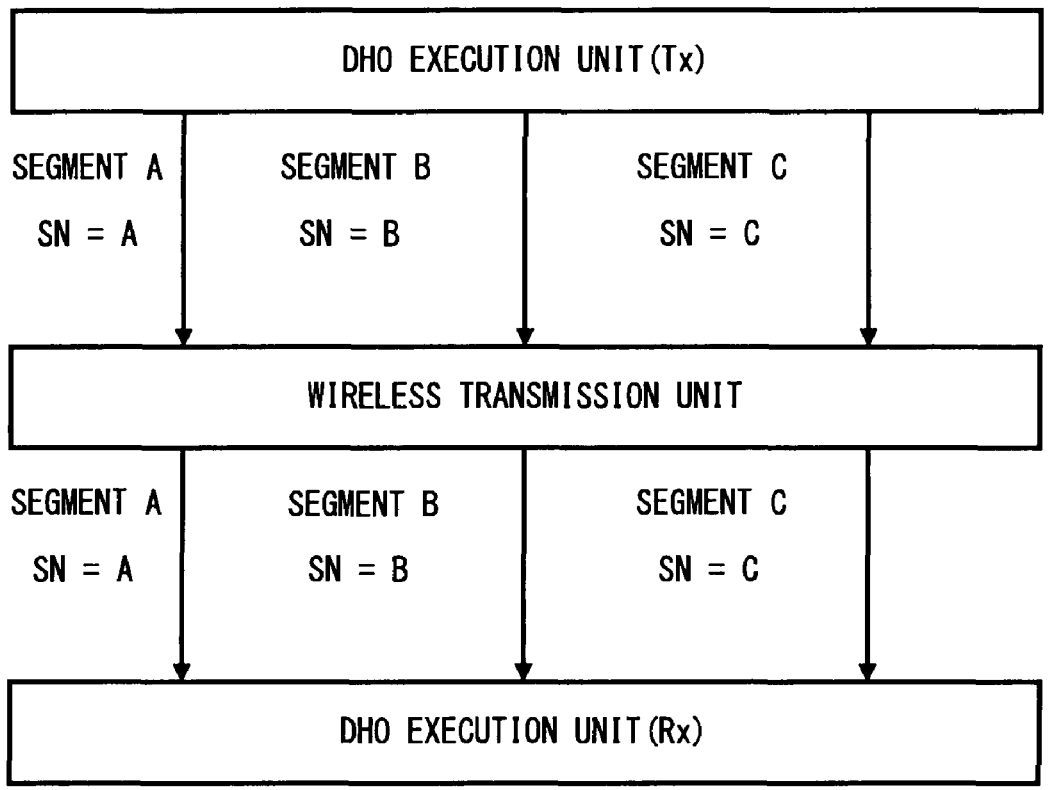
F I G. 8

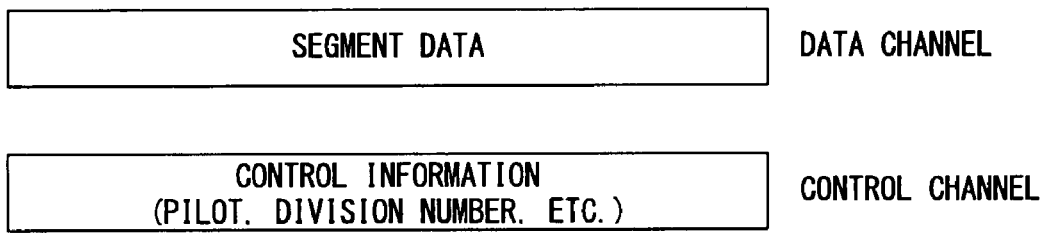
F I G. 9

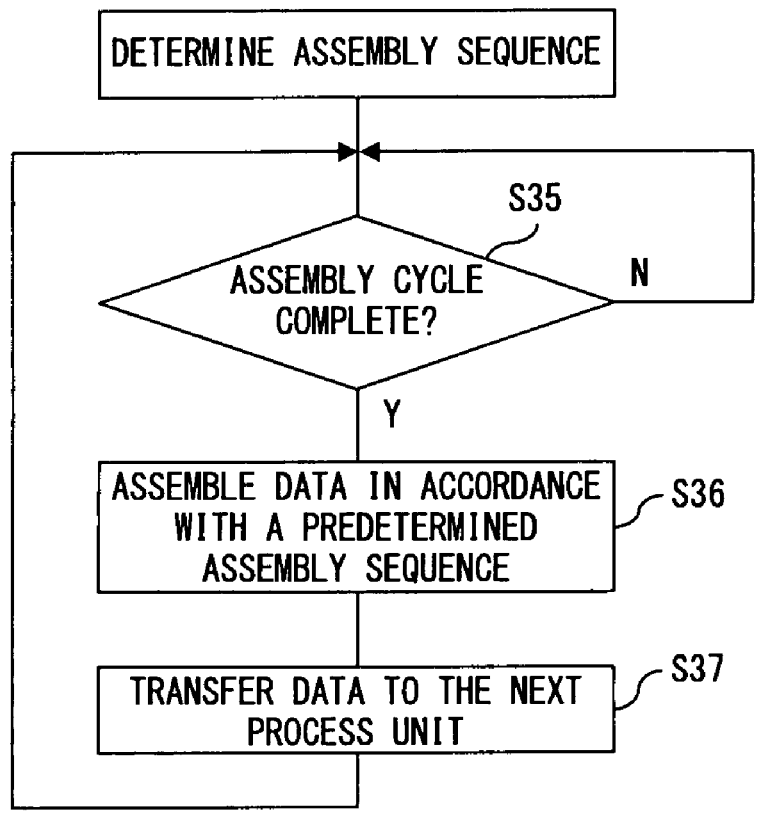
F I G. 16

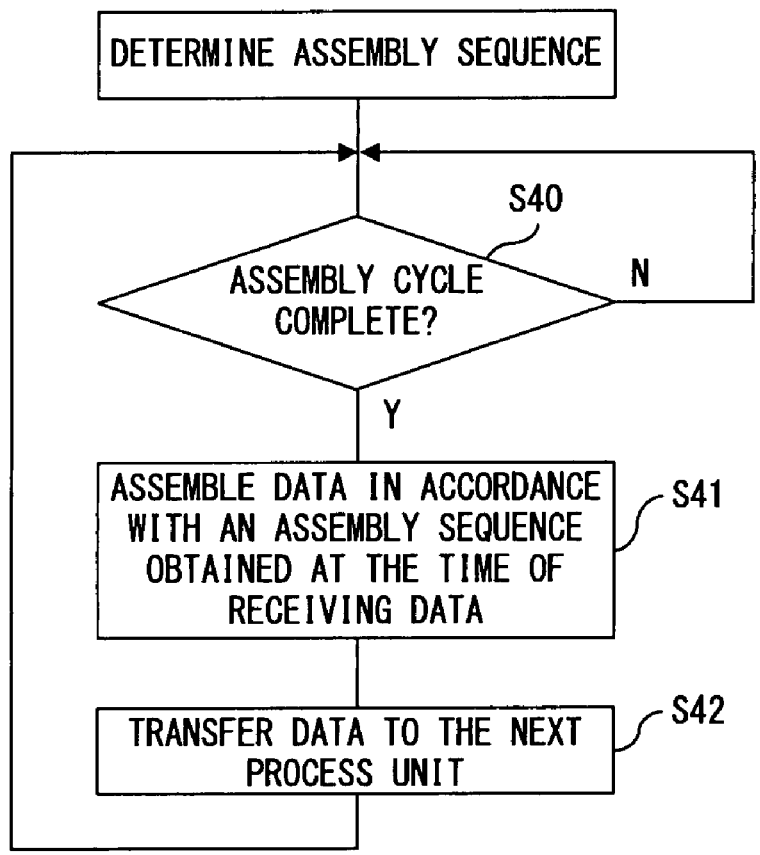
F I G. 1 7

| | MEASUREMENT CYCLE | | | | | | | | | | RESULT (No. of ×'s) | DISTRIBUTION RATIO |
|---|---|---|---|---|---|---|---|---|---|---|---|---|
| | 0 | 1 | 2 | 3 | 4 | 5 | 6 | 7 | 8 | 9 | | |
| BTS#0 | ○ | ○ | × | ○ | × | ○ | ○ | × | × | ○ | 4 | 1 |
| BTS#1 | × | × | × | × | × | ○ | × | × | ○ | × | 8 | 2 |

FIG. 19

| | MEASUREMENT CYCLE | | | | | | | | | | RESULT (No. of ×'s) | CURRENT DISTRIBUTION RATIO | DISTRIBUTION RATIO |
|---|---|---|---|---|---|---|---|---|---|---|---|---|---|
| | 0 | 1 | 2 | 3 | 4 | 5 | 6 | 7 | 8 | 9 | | | |
| BTS#0 | ○ | ○ | × | ○ | × | ○ | ○ | × | × | ○ | 4 | 2 | 1 |
| BTS#1 | × | × | × | × | × | ○ | × | × | ○ | × | 8 | 1 | 1 |

F I G. 2 0

| MEASUREMENT CYCLE | DATA DISTRIBUTION RATIO | | |
|---|---|---|---|
| | CYCLE 1 | CYCLE 2 | CYCLE 3 |
| BTS#0 | 5 | 6 | 6+1 |
| BTS#1 | 2 | 3 | 3 |
| BTS#2 | 3 | 1 | — |
| BEST TRANSMISSION PATH | BTS#0 | BTS#0 | BTS#0 |
| EVENT | — | DELETE BTS#2 | — |

FIG. 23

|  | BER | INVERSE | DISTRIBUTION RATIO |
|---|---|---|---|
| BTS#0 | $5 \times 10^{-2}$ | 20 | 2 |
| BTS#1 | $10 \times 10^{-2}$ | 10 | 1 |

F I G. 24A

|  | BER | INVERSE | CURRENT DISTRIBUTION RATIO | DISTRIBUTION RATIO |
|---|---|---|---|---|
| BTS#0 | $5 \times 10^{-2}$ | 20 | 1 | 1 |
| BTS#1 | $10 \times 10^{-2}$ | 10 | 2 | 1 |

| MEASUREMENT CYCLE | | | | | | | | | | | TOTAL | DISTRIBUTION RATIO |
|---|---|---|---|---|---|---|---|---|---|---|---|---|
| | 1 | 2 | 3 | 4 | 5 | 6 | 7 | 8 | 9 | 10 | | |
| BTS#0 | 1 | 1 | 1 | 1 | 1 | 0 | 0 | 0 | 0 | 0 | 1 | 1 |
| BTS#1 | 0 | 0 | 0 | 0 | 0 | 1 | 1 | 1 | 1 | 1 | 4 | 4 |
| WEIGHT | 0.1 | 0.2 | 0.3 | 0.4 | 0.5 | 0.6 | 0.7 | 0.8 | 0.9 | 1.0 | | |

TELECOMMUNICATION SYSTEM AND TRANSMISSION METHOD

CROSS REFERENCE TO RELATED APPLICATION

This application is a continuation of international PCT application No. PCT/JP2005/004133 filed on Mar. 9, 2005.

BACKGROUND OF THE INVENTION

1. Field of the Invention

The present invention relates to a telecommunication system and a transmission method, and in particular to the ones preferably applicable to a mobile telecommunication system based on Code Division Multiple Access (CDMA) system.

2. Description of the Related Arts

A diversity handover (DHO) between base stations (BTS) used for a Third Generation Partnership Project (3GPP) system is accomplished by a selective synthesis/duplicate distribution at a mobile terminal (i.e., a user end (UE))/base station control apparatus (i.e., a radio network controller (RNC)). That is, the same data is transmitted and received by way of two or more radio transmission paths so as to select the data with good transmission quality (i.e., in which error-free data has arrived) is selected.

FIG. 1 is a diagram showing an image of an inter-base station DHO.

A mobile terminal UE is in telecommunication (sometimes abbreviated as "telecom" hereinafter) with a plurality of base stations Node B by way of a plurality of wireless lines Uu, and these base stations Node B is in telecom with a base station control apparatus RNC by way of a telecom line Iub. When carrying out a DHO, the same data is transmitted from the base station control apparatus RNC to individual base stations Node B, and the respective base stations Node B sends the same data to one mobile terminal UE. The mobile terminal UE applies a despreading process to each of the individual pieces of the same data sent from the respective base stations Node B, followed by synthesizing it, obtaining demodulation data, applying an error correction decoding process and reproducing transmission data. When a mobile terminal UE moves from under a management of a certain base station Node B to under a management of another base station Node B, a selective reception of data from a line with a good transmission quality results in selecting data from an approaching base station Node B, while naturally not selecting data from a leaving base station Node B, thereby accomplishing an interrupt-free handover.

When carrying out a DHO in the 3GPP system, however, a wireless capacity decreases with increased transmission paths because the same data is transmitted to a plurality of transmission paths.

FIG. 2 is a diagram showing a flow of data at carrying out a DHO in the 3GPP system in the case of the number of wireless transmission paths being two.

An original one piece of Information Data is copied and allocated to two wireless transmission paths. A cyclic redundancy check (CRC) bit is added to the Information Data, the resultant is turbo-coded, and a Terminal bit that is a redundancy bit is added to the turbo-coded. Then, a first interleaving process is applied, and the interleaved data is divided into two pieces of data for example. Then, a rate matching is applied, a second interleaving process is applied, divided into slots and sent out on a wireless frame.

As described above, since the information data is copied and transmitted from the base station control apparatus to base station, the line between the base station and base station control apparatus is extraneously used, and also the wireless line between the base station and mobile terminal extraneously used.

Furthermore, although individual wireless transmission paths are mutually separated by different spreading codes, an increase in power occurs for securing a desired signal to interference ratio (SIR) because another wireless transmission path becomes a noise for a certain wireless transmission path when performing despreading.

FIG. 3 is a diagram describing a degradation of a signal to interference ratio (SIR).

In the CDMA telecom system, data is transmitted by using a single carrier, and therefore data in a spread state in different wireless transmission paths are transmitted as being overlapped with one another in the same frequency band. A mobile terminal obtains a signal in a single wireless transmission path as a result of despreading, while data in another wireless transmission path is received in a state of being spread, thus becoming a noise for the despread data of a wireless transmission path. Therefore, such a noise increases with the number of wireless transmission paths.

A reference patent document 1 has disclosed handoff means allowing no instantaneous interrupt, having a cell diversity effect, and preventing a downlink wireless resource usage volume at a wireless base station from varying between the time of non-handoff and that of a handoff.

Patent document 1: Laid-Open Japanese Patent Application Publication No. 2000-217139

SUMMARY OF THE INVENTION

The object of the present invention is to provide a telecom system employing a soft handover system capable of saving a wireless resource and also maintaining a good transmission quality when a mobile terminal receives data.

A telecommunication system according to the present invention comprises an error correction coding unit for applying an error correction coding to data to be transmitted; an interleave unit for applying an interleaving to the error correction-coded data; a division unit for dividing the interleaved data; and a transmission unit for transmitting the divided pieces of data from respectively different wireless apparatuses by way of different wireless transmission paths.

BRIEF DESCRIPTION OF DRAWINGS

FIG. 1 is a diagram showing an image of an inter-base station DHO;

FIG. 4 is a diagram describing an advantage of an OFDM;

FIG. 8 is a diagram describing an example of a method for combining segmented data (part 1);

FIG. 9 is a diagram describing an example of a method for combining segmented data (part 2);

FIG. 16 is a flow chart of a DHO unit according to a preferred embodiment of the present invention (part 3);

FIG. 17 is a flow chart of a DHO unit according to a preferred embodiment of the present invention (part 4);

FIG. 19 is a diagram describing an example of a method for judging a distribution ratio of data;

FIG. 20 is a diagram describing another example of a method for judging a distribution ratio of data;

FIG. 23 is a diagram showing a situation of allocating a distribution value of a transmission path as a subject of deletion;

FIG. 24 is a diagram exemplifying a data division ratio judgment method;

FIG. 27 is a diagram exemplifying a judgment in the case of the number of data reception times given as a measurement interval being ten times;

DESCRIPTION OF THE PREFERRED EMBODIMENTS

Figure 2:
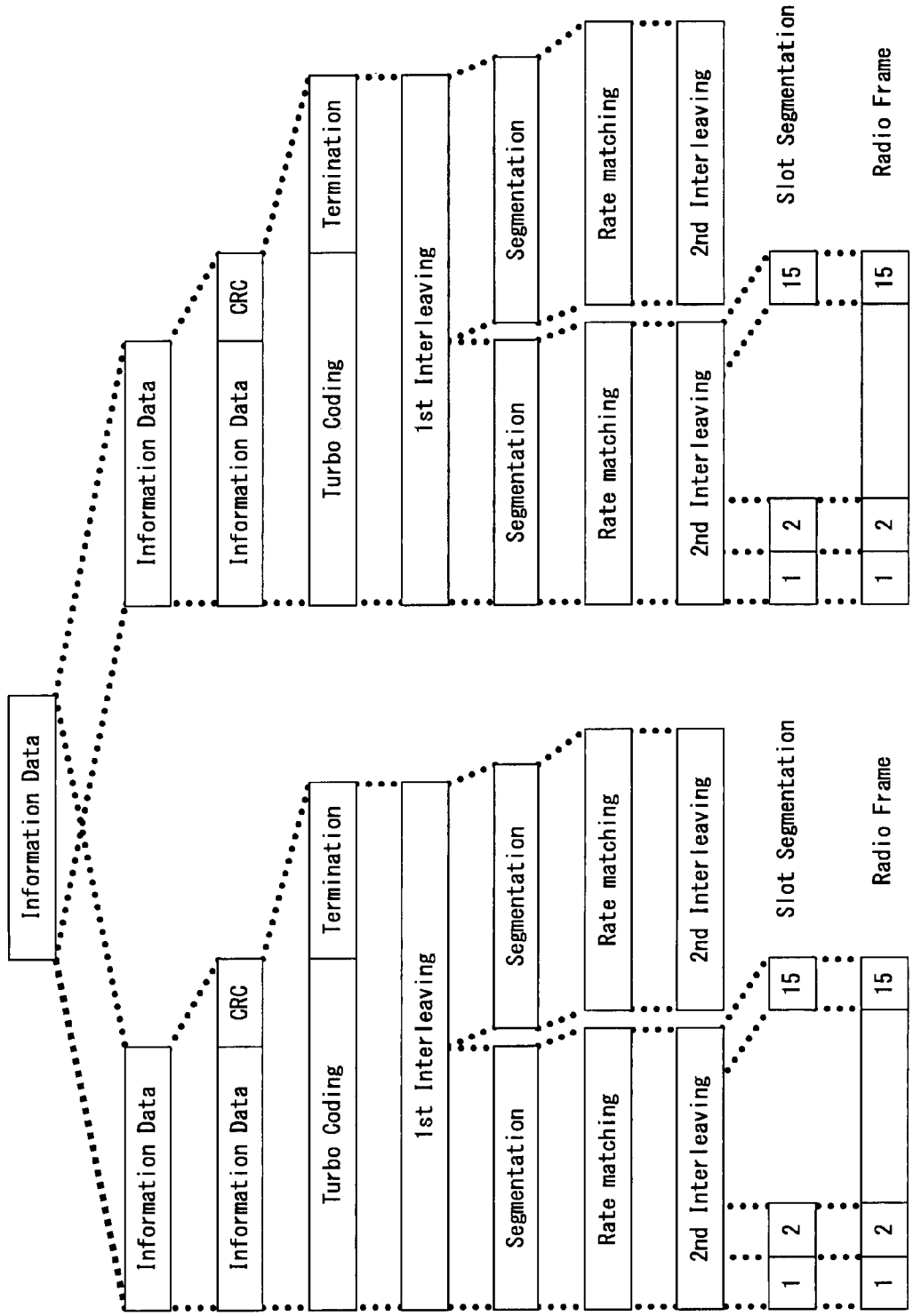
FIG. 2 is a diagram showing a flow of data at carrying out a DHO in the 3GPP system in the case of the number of wireless transmission paths being two.
Figure 3:
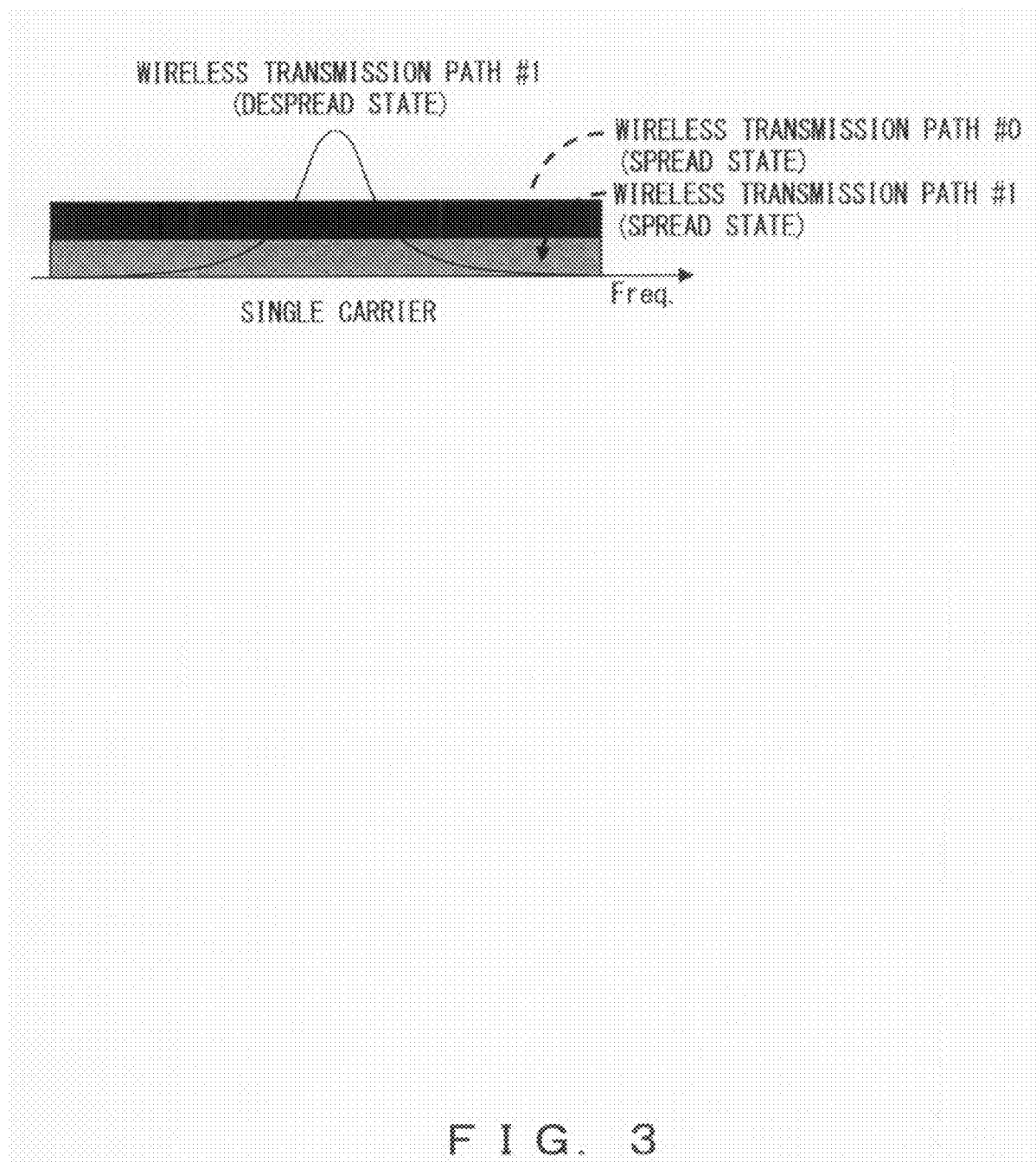
FIG. 3 is a diagram describing a degradation of SIR.

A preferred embodiment of the present embodiment is configured to utilize a sub-carrier in an Orthogonal Frequency Division Multiplexing (OFDM) system, thereby enabling a reduction of an influence of a frequency selective fading.

Recently collecting attentions as the next telecom system is an Orthogonal Frequency and Code Division Multiplexing (OFCDM) system which further applies a code division multiplexing by a spreading code in the ODFM system parallelly transmitting data by using a plurality of sub-carriers, thereby aiming at multiplexing users in the same frequency.

The OFDM per se has the following advantages:
Robust against a narrow band interference;
Robust against a frequency selective fading;
High frequency utilization efficiency; and
Capable of a frequency domain process FIG. 4 is a diagram describing an advantage of an OFDM. As shown in FIG. 4, the normal CDMA transmits data by using a single carrier, while the OFDM transmits data by using a plurality of orthogonal sub-carriers. The OFDM transmits data by using a plurality of sub-carriers, and therefore only a certain sub-carrier is influenced even if a frequency selective fading occurs. Moreover, the influenced sub-carrier is allowed to regard a frequency selective fading as a flat fading (i.e., a simple attenuation), resulting in lowering a desired SIR of only a sub-carrier influenced by the frequency selective fading, and therefore a controlling of an electric power (named as "power" hereinafter) for each sub-carrier makes it possible to avoid the problem of the frequency selective fading.

Contrarily, if a frequency selective fading occurs in the case of using a single carrier, the entirety of the transmission carriers is influenced, resulting in influencing the entirety of the transmission data. Even if the problem is tried to be solved by a power control, an improvement is difficult in a frequency band influenced by the frequency selective fading and therefore it is difficult to lead to an improvement of a bit error rate (BER).

In a wireless transmission system, such as OFDM, using sub-carriers, it is easier to guarantee a wireless transmission in the unit of sub-carrier than a wireless transmission using a single carrier.

Since a current system is one using a single carrier, the same data is transmitted to all transmission paths at the time of carrying out a DHO for alleviating the problem of easily destructing the data at the time of carrying out a DHO so that a mobile station aims at a diversity effect by synthesizing them.

Therefore, the embodiment described below is preferably configured to employ the OFCDM system; a wireless system, however, can adopt the CDMA system or OFDM system.

The preferred embodiment of the present invention is configured to divide data by a number corresponding to the number of wireless transmission paths (e.g., an N-division if there is an N-number of wireless transmission paths) and transmit the divided pieces of data by using the respective wireless transmission paths, in lieu of transmitting the same data if a wireless transmission path is added at the time of carry out a DHO, thereby reducing a volume of data transmitted in a single transmission path, resulting in minimizing a degree of another transmission path becoming a noise against a specific transmission path.

The individual wireless transmission paths are preferably transmitted from respectively different wireless base stations.

Here, transmission-subject data is applied by an interleaving process before being divided into a plurality of wireless transmission paths. This process eliminates a deviation of quality among the transmission paths, and thus the quality is averaged out.

Figure 5:
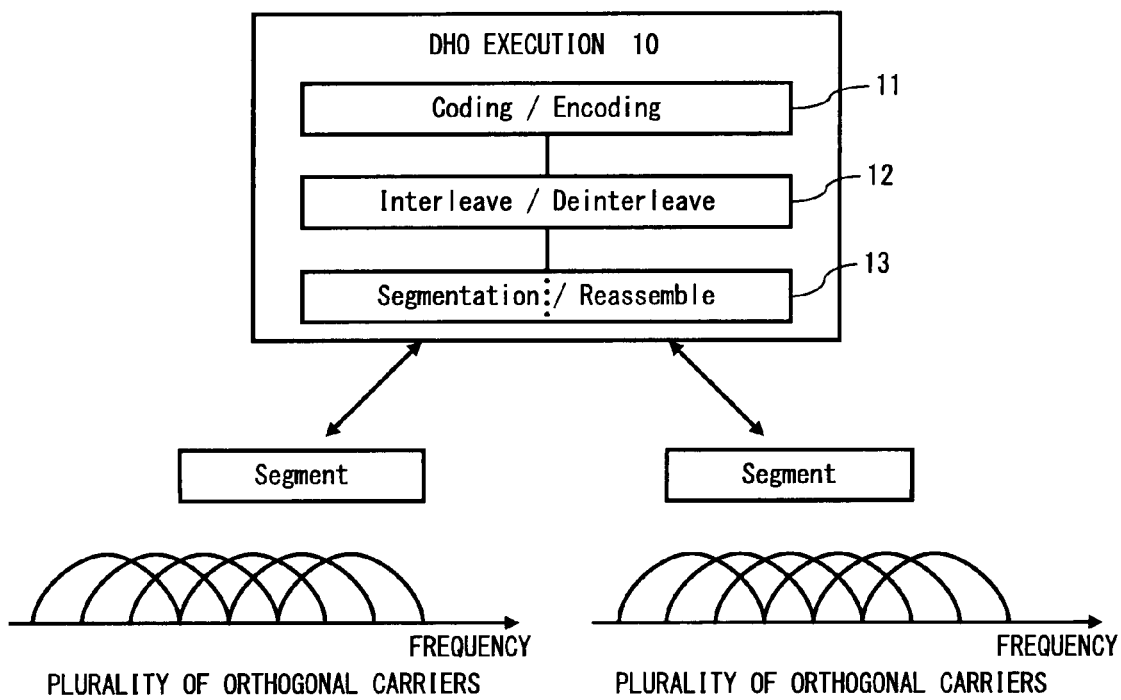
FIG. 5 is a block diagram showing a conceptual configuration of a DHO execution unit according to a preferred embodiment of the present invention.

FIG. 5 is a block diagram showing a conceptual configuration of a DHO execution unit according to a preferred embodiment of the present invention. The DHO execution unit 10 is equipped with an interleave/de-interleave unit 12 for applying an interleaving/de-interleaving process, and with a segmentation/reassembly unit 13 for applying a segmentation/reassembly process. The data that is coded in a coding/decoding unit 11 is interleaved at the interleave/de-interleave unit 12, divided for respective wireless transmission paths at the segmentation/reassembly unit 13 and transmitted thereto. The divided pieces of data received from the respective wireless transmission paths are merged at the segmentation/reassembly unit 13, then de-interleaved at the interleave/de-interleave unit 12 and decoded at the coding/decoding unit 11 to be received.

The DHO execution unit 10 is equipped in a mobile terminal and also in a base station control apparatus for controlling the respective DHOs.

Figure 6:
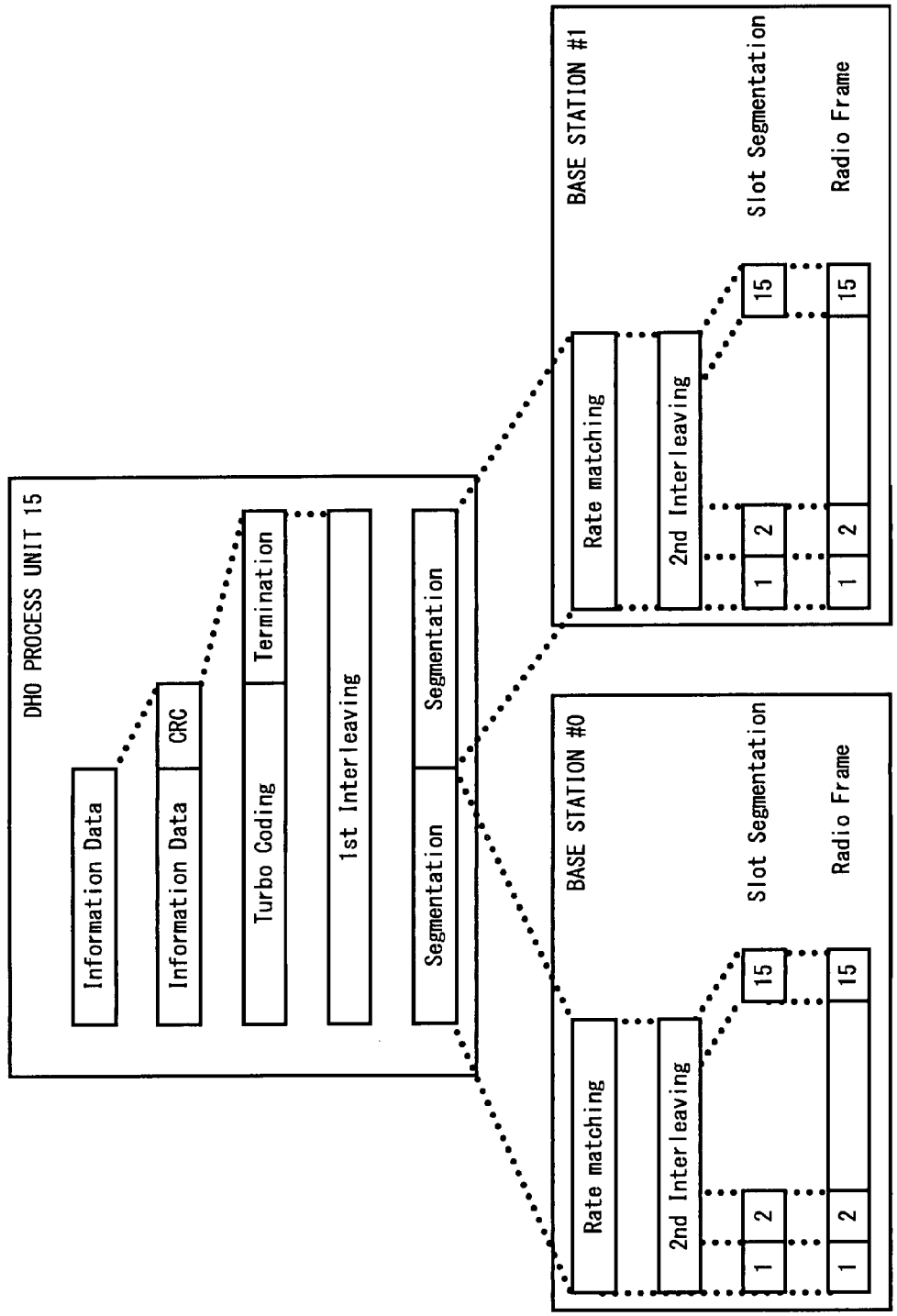
FIG. 6 is a diagram showing a conceptual configuration of a DHO process unit equipped on a base station or wireless network side according to a preferred embodiment of the present invention.

FIG. 6 is a diagram showing a conceptual configuration of a DHO process unit equipped on a base station side or wireless network side according to a preferred embodiment of the present invention. The DHO process unit 15 is configured to carry out the following processes. The DHO process unit 15 may exist in a place other than an RNC (e.g., an upper layer apparatus than the RNC, a base station, et cetera) for use in a 3GPP system:

(1) An error correction process after merging transmission subject data with a CRC;

(2) an interleaving process after applying the process of the above (1);

(3) dividing the data applied by the process of (2) into one or more segments and transmitting them to the base station; and (4) a rate matching process such as a puncture (which is optional).

The base station transmits data received from the DHO process unit 15 to a wireless section.

Here, the base station on one side utilizes a first spreading code, as is, which has already been used prior to a handover, and the base station on the other side performs a transmission by utilizing a second spreading code specified at the time of starting the handover. It is apparent that the frequency used at the base station on one side is the same as that used at the base station on the other side.

Therefore, it is not necessary for a pre-handover base station to transmit by further adding a spreading code at the time of carrying out a handover, thereby making it possible to suppress an increase of the number of spreading codes occupied by one mobile station at the time of a handover.

The configuration shown in FIG. 6 notes the second rate matching and the interleaving process, it may be, however, possible to apply an error correction coding process prior to the second rate matching.

The DHO process unit 15 applies a procedure that is reverse to a data transmission process to data transmitted to the DHO process unit 15 following an application of a process for receiving data of a wireless section at the base station, thereby decoding the data.

Incidentally, in the case of equipping the base station with a DHO process unit, the individual wireless stations obtain coded data by applying respectively the same error correction coding procedures (i.e., the same turbo coding processes) to the same data received from upper layer apparatus (e.g., an RNC), and apply interleaving processes in the same interleaving pattern. Then the first and second wireless base stations extract a first part and a second part, respectively, from the post-interleaved data, followed by applying the respective rate matching and second interleaving process to the data, and transmitting them, respectively.

Here, the first and second parts are preferably not overlapped with each other, and constitute post-interleaved data when the two parts are combined together. Note that it is possible to obtain a diversity effect for an important bit part by providing with an overlap part (e.g., overlapping an systematic bit part in the case of carrying out a systematic coding such as a turbo coding) between the first and second parts.

Figure 7:
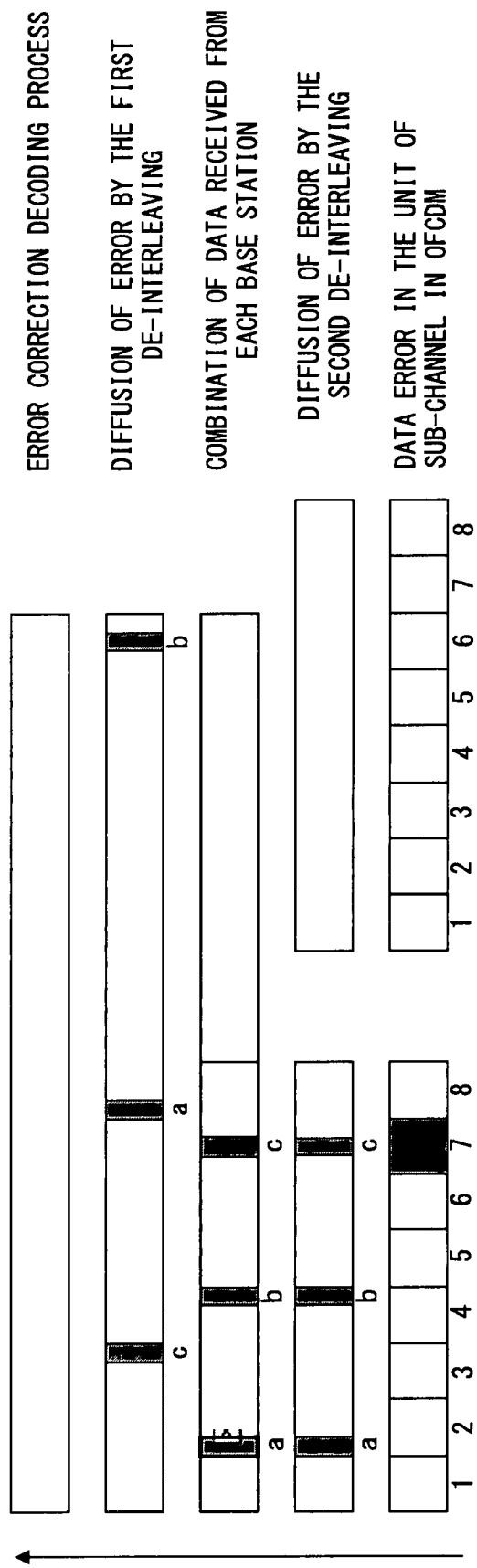
FIG. 7 is a diagram showing a situation of a process for receiving data in the case of employing an OFCDM system according to a preferred embodiment of the present invention.

FIG. 7 is a diagram showing a situation of a process for receiving data in the case of employing an OFCDM system according to a preferred embodiment of the present invention.

First, data is received for each sub-channel according to the OFCDM at each base station as shown on the bottom of FIG. 7. Let it be assumed that an error has occurred in the seventh sub-channel in this event. The second interleaving process is applied to the data respectively received from two wireless transmission paths and the error is spread within divided data. Then, the data is sent from each base station to the base station control apparatus and the data are combined. Then, the first interleaving process is carried out at the base station control apparatus so that the error of the data is spread in the entirety thereof. And an error correction coding process is applied to the entirety of data and the error is corrected.

For the reception side to combine the divided (i.e., segmented) data in this event, the conceivable methods are as follows:

(1) merge the transmitted segmented data with combination serial numbers; or (2) Predetermine combination serial numbers for the transmission paths, in which data are transmitted, at the transmission and reception sides.

In the case of the combination method of (1), division numbers are given when the DHO execution unit (Tx: a circuit (at the transmission side) implementing the DHO method, either of the base station control unit or mobile terminal) transfers the segments to a wireless transmission unit. As an example, a number as division information is stored in the header of a transfer format. Here, when transmitting two or more segments to a single transmission path, in the case of transmitting by multiplexing the segments for example, the header information is also given with multiplexing information (e.g., a transport block (TB) multiplexing method (TS25.427) on the Iub in the 3GPP system), although it depends on a data transmission method at the time.

Alternatively, there is also a method (e.g., DPDCH (for a segment transmission) and DPCCH (for a control information transmission) in the 3GPP system) for the wireless transmission unit to notify the DHO execution unit (Rx (on the reception side)) of the division numbers (as control information) by using a separate channel other than one for transmitting the segments when transmitting segments as wireless data to the DHO execution unit (Rx (in the reception side)). If a plurality of segments is multiplexed and transmitted in this event, multiplexing information is also added.

When combining the individual segments received from one or more wireless transmission paths, the DHO execution unit (Rx) combines the segments in accordance with the simultaneously received division numbers.

The reason for using a separate channel for transmitting the division numbers is that the eventual transmission quality of each segment depends on a transmission quality obtained as a result of correcting an error following combining the segments according to the preferred embodiment of the present invention. Even if a separate error correction process, for example, is carried out for guaranteeing a data transfer in the individual transmission paths, separately from the preferred embodiment of the present invention, the individual segments are not necessarily required to be free of error. At a wireless transmission, however, a reception is preferably to be secured even if a radio error occurs in control information such as pilot information. The present division numbers (and furthermore the multiplexing information) also require the same high level quality, and therefore they need to be stored in a place that is separately managed in terms of a quality management when they are transmitted by way of a channel separately from one for transmitting segments, or by way of the same channel.

Figure 10:
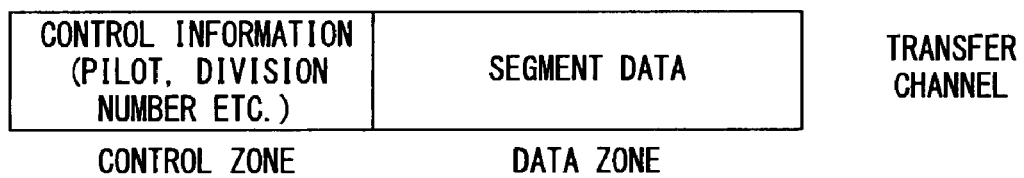
FIG. 10 is a diagram describing an example of a method for combining segmented data (part 3)

FIGS. 8 through 10 are diagrams describing an example of a method for combining segmented data.

As shown in FIG. 8, the segment A through C are sent from the DHO execution unit (Tx) to the wireless transmission unit. In this event, the division information of the segments A, B and C are SN=A, SN=B and SN=C, respectively. The DHO execution unit (Rx) receives the segments A through C and combines these based on the division information.

FIG. 9 shows a concept in the case of transmitting the division information in a channel separately from segment data. The segment data is transmitted in a data channel, and a pilot signal, division numbers and such as control information are transmitted in a control channel that is synchronized with the data channel.

The same data is transmitted from the first and second base stations as the control information for example, thereby preferably obtaining a diversity effect. That is because the division information (i.e., necessary information for division data), such as division numbers, is important information for reproducing data. Therefore, each base station transmits sequence information for combining the data transmitted from the first and second base stations, respectively.

Also, it is of course possible to notify the necessity of receiving data in the order of one received from the second base station and one received from the first base station by the first base station transmitting combination sequence information of (2) of the data transmitted therefrom and the second base station transmitting combination sequence information of (1) of the data transmitted therefrom. FIG. 10 shows the case of accommodating division information in a header or such and transmitting the information as a single wireless frame. A data frame constituted by a control zone and a data zone is transmitted to the transfer channel. The data zone stores segment data. The control zone stores a pilot signal, division numbers and so forth, as control information.

The combination method of (2) is one for the respective DHO execution units on the transmission and reception sides to predetermine in what sequence the segments are to be combined for transmission paths held for a handover. As an example, when carrying out a DHO for three transmission paths, they are attached with identifiers and the combination sequence is correlated with the identifiers.

Figure 11:
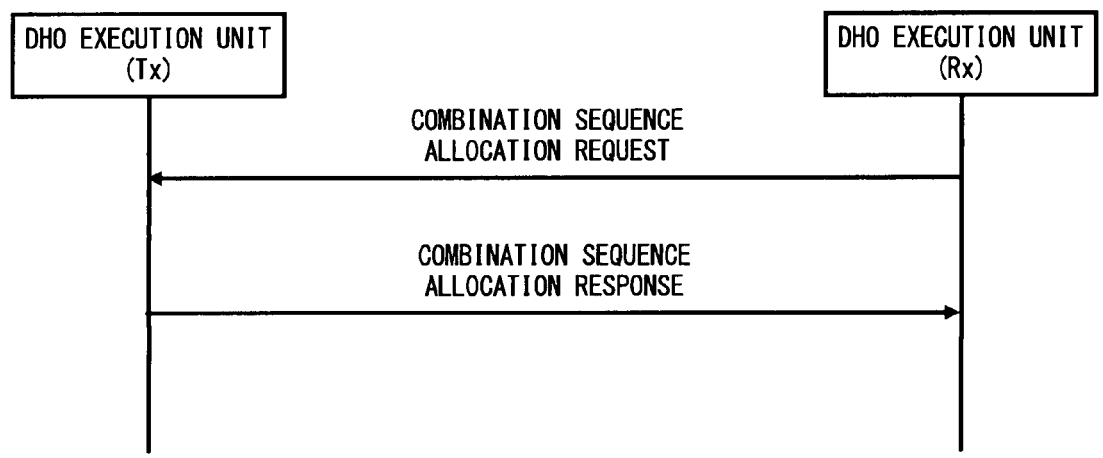
FIG. 11 is a diagram describing another example of a method for combining segmented data.

FIG. 11 is a diagram describing another example of a method for combining segmented data.

The DHO execution unit (Rx) on the reception side transmits a combination sequence allocation request to the DHO execution unit (Tx) on the transmission side. This prompts the DHO execution unit (Tx) on the transmission side to give each wireless transmission path with a combination sequence number and transmit the combination sequence numbers as a combination sequence allocation response to the DHO execution unit (Rx) on the reception side.

Furthermore, an Automatic Repeat reQuest (ARQ) function (i.e., a data retransmission function) is incorporated in the DHO execution unit. As an example, divided data is attached with a CRC which is checked by the reception side, and if it is NG (no good), an identifier (i.e., a combination number, sequence number or so) of the divided data is returned to the transmission side. The DHO execution unit retransmits subject divided data for the divided data that has been judged as NG, in which the retransmission is tried by using a transmission path with the best quality.

As an example, when carrying out a DHO in two transmission paths, if the transmission side receives a reception inability notification from the reception side for the divided data transmitted in the transmission path #1, the transmission side retransmits the subject divided data by way of the other transmission path #0.

Figure 12:
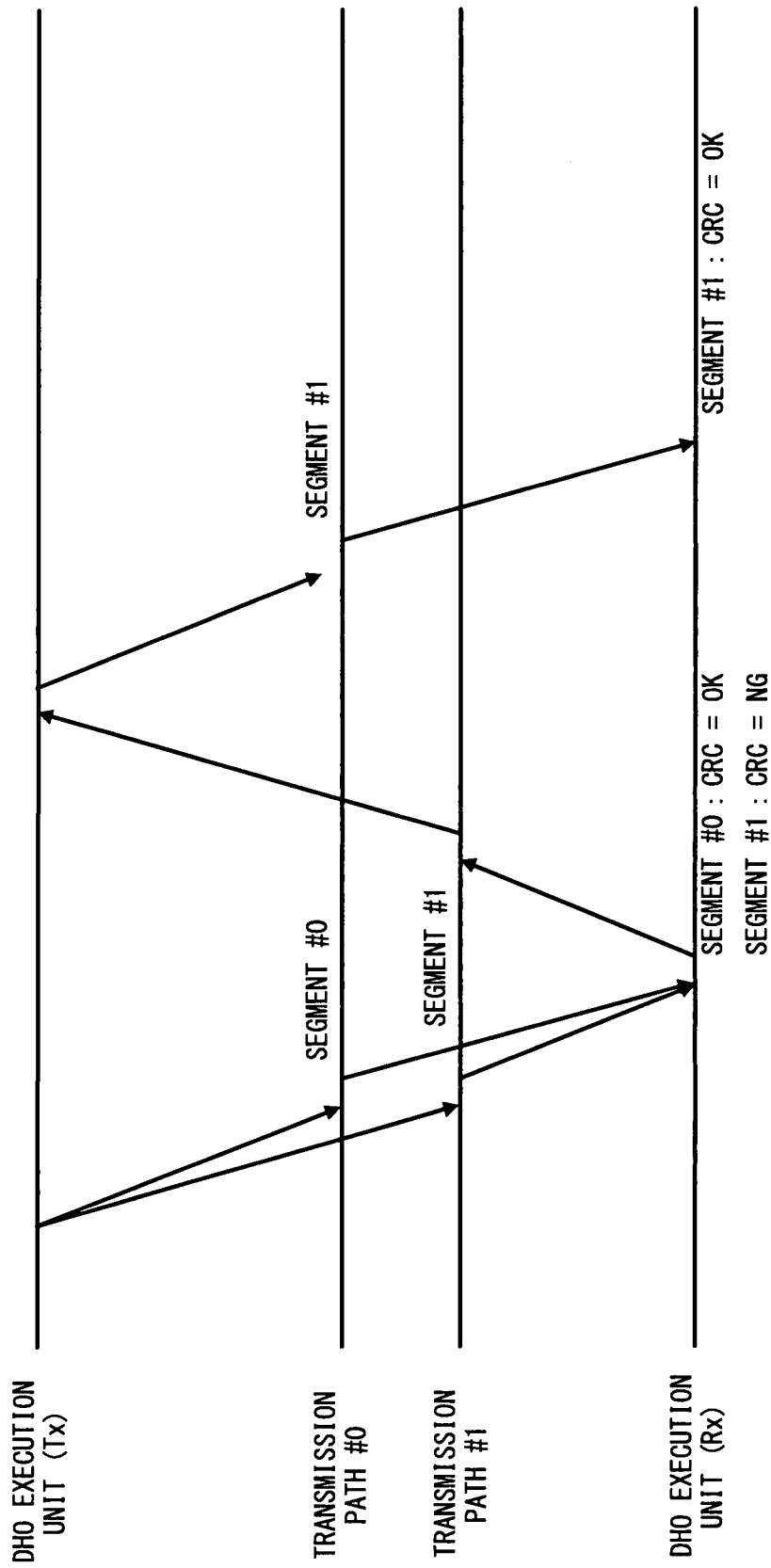
FIG. 12 is a diagram showing a flow of data in a retransmission process.

FIG. 12 is a diagram showing a flow of data in a retransmission process.

In the process shown in FIG. 12, the segments #0 and #1 are transmitted from the DHO execution unit (Tx) on the transmission side by using the transmission paths #0 and #1, respectively. The DHO execution unit (Rx) on the reception side checks the CRC added to the segment data. Here, the CRC of the segment #0 is OK and that of the segment #1 is NG. The DHO execution unit (Rx) on the reception side accordingly requests the DHO execution unit (Tx) on the transmission side for a retransmission of the segment #1. The DHO execution unit (Tx) on the transmission side detects the fact that the transmission quality of the transmission path #0 is better and accordingly transmits the segment #1 by using the transmission path #0.

Figure 13:
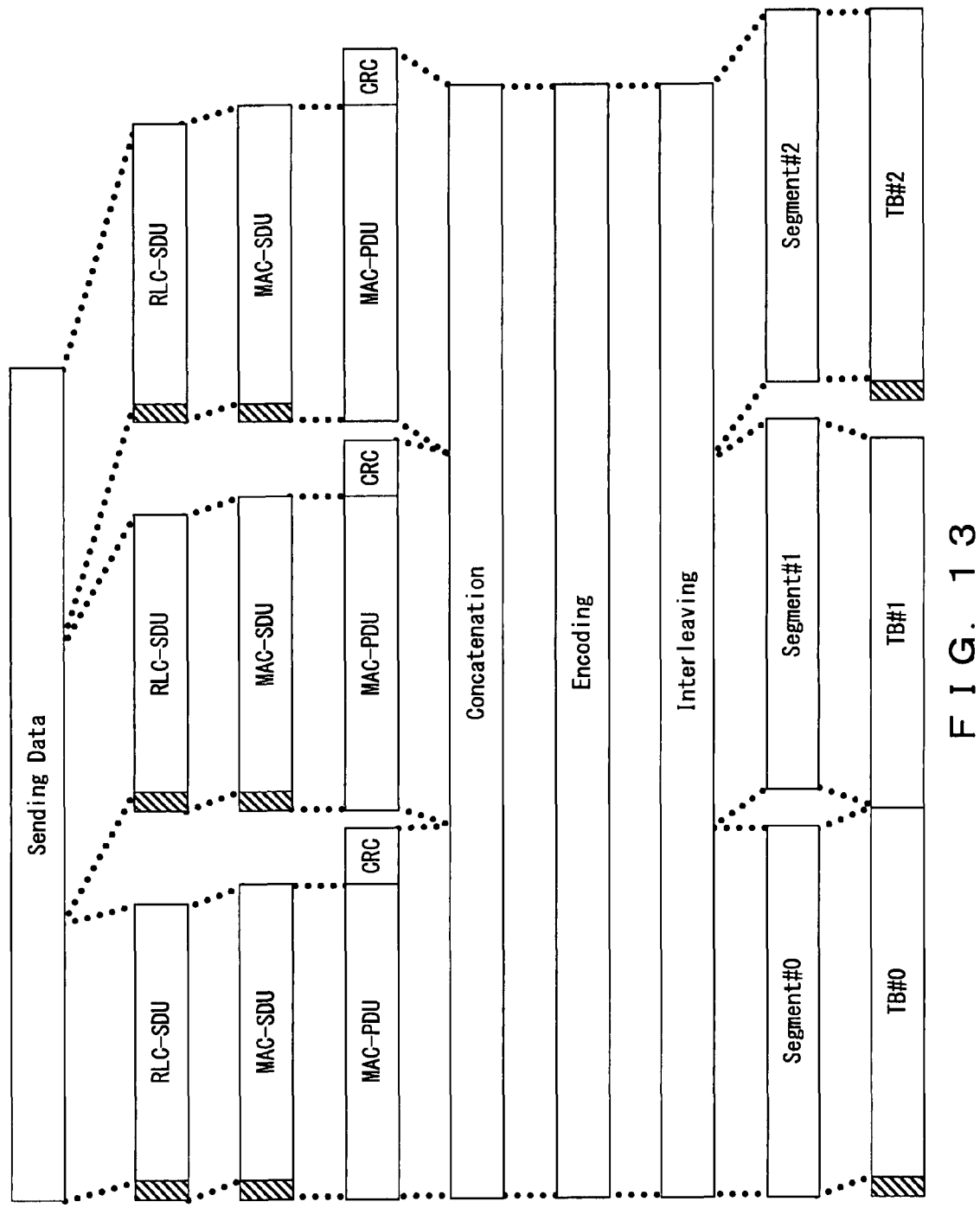
FIG. 13 is a diagram exemplifying the case of applying a preferred embodiment of the present invention to a 3GPP.

FIG. 13 is a diagram exemplifying the case of applying a preferred embodiment of the present invention to a 3GPP.

In the 3GPP system, the DHO process unit carries out until the segment process shown in FIG. 13 among the processes carried out at the base station. It then handles each segment as a Transport Block (TB) and transmits it to the base station in the form of applying an Iub-FP format process.

FIG. 13 shows the state of transmitting the TB#0 and TB#1 to the base station #0, while the TB#2 to the base station #1.

The application as described above makes it possible to apply the preferred embodiment of the present invention also to the 3GPP system. Note that a spreading code or so at the time of transmission can employ a method similar to the above described.

The necessary information for assembly needs to be notified to the reception side because of the necessity of assembling the divided data at the reception side. As proposed in the present specification, a pre-negotiation or adding it to transmission data is the available method.

FIGS. 14 through 17 are flow charts of a DHO unit according to a preferred embodiment of the present invention.

The basic flow is the method of pre-negotiation. On the other hand, the method of adding the necessary data to transmission data determines an assembly sequence based on a DHO state, the number of transmission paths and such, and notifies a correspondent of the determined information together with a data transmission.

In the case of carrying out a pre-negotiation, it is accomplished by defining an assembly sequence for each transmission path. In the case of an inbound notification, the reception side assembles in accordance with the sequence based on the identifier (such as an assembly number) acquired at the time of receiving data from the respective transmission paths.

The assembly number used at the time of assembly is a value varying in accordance with a DHO state. That is, the number of its branches (i.e., the number of transmission paths) may be changed by a radio wave condition in the case of maintaining a state of soft handover (i.e., the frequency is the same between the pre- and post-handover). Consequently carried out is the following:

The method of determining by carrying out a pre-negotiation:

Every time a DHO state is changed, an assembly sequence (i.e., assigning an assembly sequence to each transmission path) at the transmission and reception sides is determined (i.e., a negotiation takes place: changeover timing is specified)

Method of carrying out an inbound notification:

The transmission side determines uniquely regardless of a DHO state. The final segment is made to be identifiable for enabling a detection of a segment loss.

Figure 14:
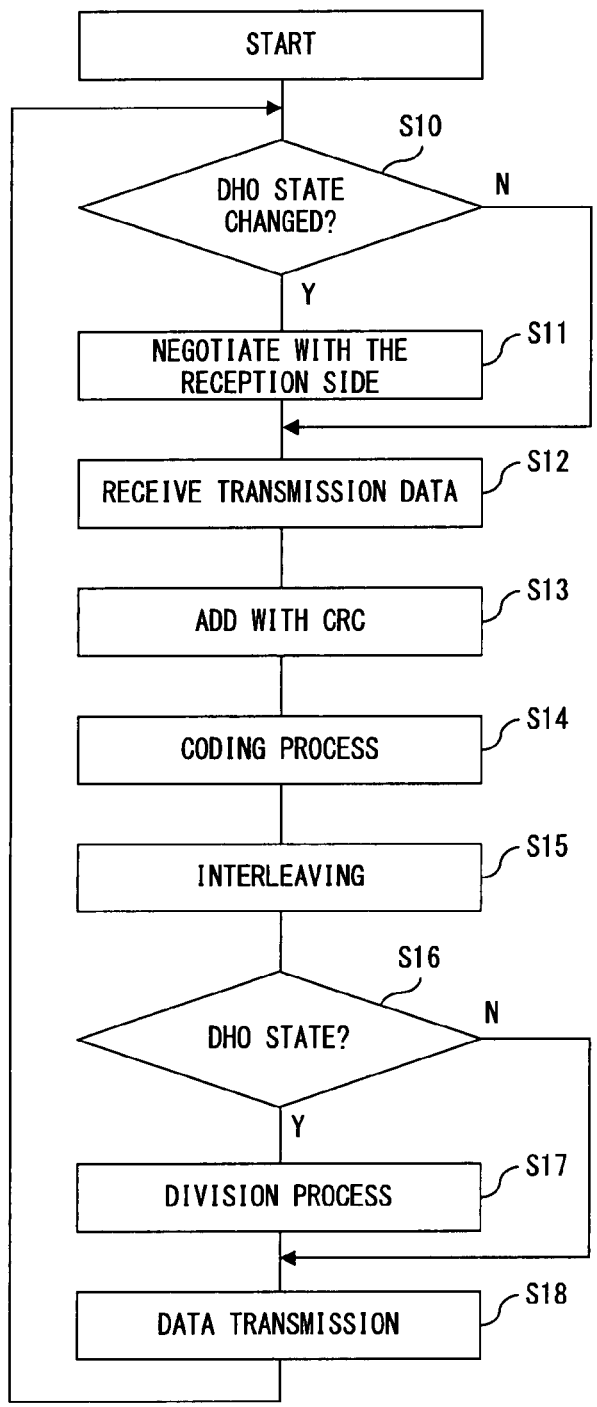
FIG. 14 is a flow chart of a DHO unit according to a preferred embodiment of the present invention (part 1)

FIG. 14 is a flow chart at the transmission side in the case of an assembly sequence of segment data being pre-negotiated with the reception side.

In the step S10 (the word "step" is basically omitted hereinafter), judged is whether or not a DHO state is changed. If the judgment of the S10 is "no", the transmission side shifts the process to S12. If the judgment of the S10 is "yes", it negotiates with the reception side in S11 and shifts the process to S12 in which it receives transmission data, followed by adding the received transmission data with a CRC in S13. Then it applies a coding process in S14, performs an interleaving process in S15, and judges whether or not the state is of performing a DHO in S16. If the judgment of the S16 is "no", it shifts the process to S18. If the judgment of the S16 is "yes", it applies a division process in S17 and shifts the process to S18. It transmits the data in S18 and returns to the S10.

Figure 15:
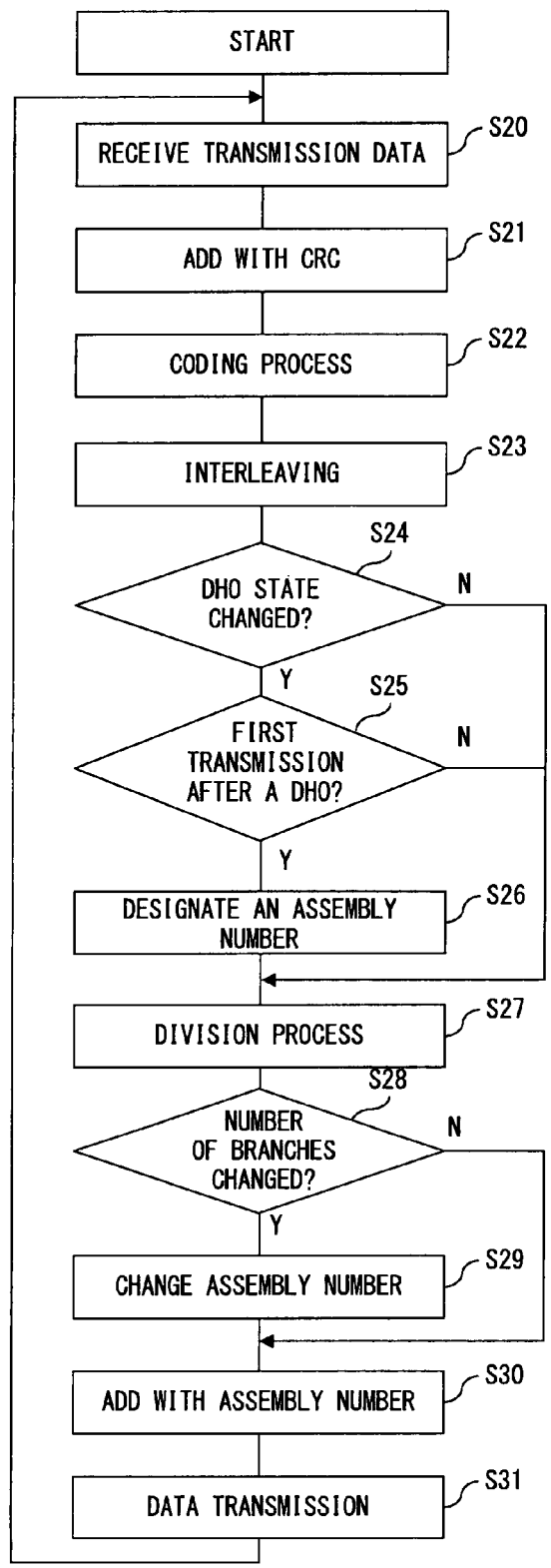
FIG. 15 is a flow chart of a DHO unit according to a preferred embodiment of the present invention (part 2)

FIG. 15 is a flow chart at the transmission side in the case of adding transmission data with an assembly sequence of segment data.

In S20, the transmission side receives transmission data. It adds the received transmission data with a CRC in S21. It applies a coding process in S22, and an interleaving process in S23. It then judges whether or not a state is in carrying out a DHO in S24. If the judgment of the S24 is "no", it shifts the process to S27. If the judgment of the S24 is "yes", it judges whether or not the first data after carrying out a DHO has been transmitted in S25. If the judgment of the S25 is no it shifts to S27. If the judgment of the S25 is "yes", it designates an assembly number in S26 and applies a division process in the S27. It then judges whether or not there is a change in the number of branches (i.e., the number of wireless transmission paths) in S28. If the judgment of the S28 is "no", it shifts the process to S30. If the judgment of the S28 is "yes", it changes an assembly number in S29, adds the divided transmission data with the assembly number in S30, transmits the transmission data in S31 and returns the process to the S20.

FIG. 16 is a flow chart at the reception side in the case of an assembly sequence of segment data being pre-negotiated with the reception side.

In S35, the reception side judges whether or not an assembly cycle is complete (i.e., all data to be assembled has been received). If the judgment of the S35 is "no", it repeats the process of the S35. If the judgment of the S35 is "yes", it assembles data in accordance with the predetermined assembly sequence in S36. It then transfers the data to the next process unit in S37 and returns the process to the S35.

FIG. 17 is a flow chart at the reception side in the case of adding transmission data with an assembly sequence of segment data.

In S40, the reception side judges whether or not an assembly cycle is complete (i.e., all assembly data has been received). If the judgment of the S40 is "no", it repeats the process of the S40. If the judgment of the S40 is "yes", it assembles data in accordance with the assembly sequence, which is obtained at the time of receiving the data, in S41. It then transfers the data to the next process unit and returns the process to the S40. A segment loss can be detected by an assembly sequence. An occurrence of a segment loss is notified to the later stage process, prompting a retransmission of the segment depending on a situation. Here, a retransmission method/procedure for example may conceptually employ a technique disclosed in the High Speed Downlink Packet Access (HSDPA).

Therefore, it is conceivable to notify the DHO unit on the transmission side of a request for retransmitting a segment so as to be retransmitted by using a transmission path that is judged to be the best wireless transmission path, and also possible to accomplish a retransmission control at a functional unit managing the wireless transmission of a segment transmitted from the DHO unit on the transmission side as in the case of the HSDPA technique.

Furthermore, when retransmitting as a result of receiving a retransmission request at the DHO unit on the transmission side, only the segment can be considered as a subject of transmission so as to transmit it to a plurality of transmission paths by further dividing into segments.

The above described embodiment is expected to provide the following benefits:

(1) Enabling a suppression of a total data transmission volume by means of DHO;

(2) Enabling a suppression of an increase in the power by means of DHO. This is due to a reduced transmission data volume in each wireless transmission path in association with an addition of wireless transmission path (i.e., enabling a data transmission in a high diffusion ratio, et cetera); and (3) An increased wireless volume by virtue of suppressing the power because of the above paragraph (2).

The preferred embodiment proposes a transmission of data by dividing into the respective of wireless transmission paths, instead of transmitting the same data, in the case of becoming a state (i.e., a DHO state) having a plurality of wireless transmission paths. This assumes the case of applying the OFCDM to a wireless system, and focuses on a characteristic of the OFDM system, namely, being capable of avoiding an influence of a frequency selective fading. That is, based on the fact of being unnecessary to transmit the same data by using a different wireless transmission path for expecting a diversity effect.

As a further preferred embodiment of the present invention, proposed by virtue of the following description is an execution of a data division by taking a transmission path quality in each wireless transmission path into consideration.

Specifically, a wireless transmission/reception unit (i.e., a base station) hands (downlink-) wireless transmission path quality information over to a DHO process unit (i.e., an RNC: a base station control apparatus); or a mobile terminal (i.e., a wireless transmission/reception unit) hands (uplink-) wireless transmission path quality information over to a mobile terminal (i.e., a DHO process unit).

The DHO process unit determines a data volume (i.e., a ratio of dividing data) for transmitting to each of wireless transmission path based on the wireless transmission path quality information, and transmits the divided data. The above described embodiment is configured to equally divide data, whereas changing a ratio of dividing data results in sending a larger amount of data in one transmission path and smaller amount thereof in the other transmission path. Incidentally, the following description exemplifies the case of the number of transmission paths being two, likewise the above described embodiment; the number thereof, however, may be discretionary.

Figure 18:
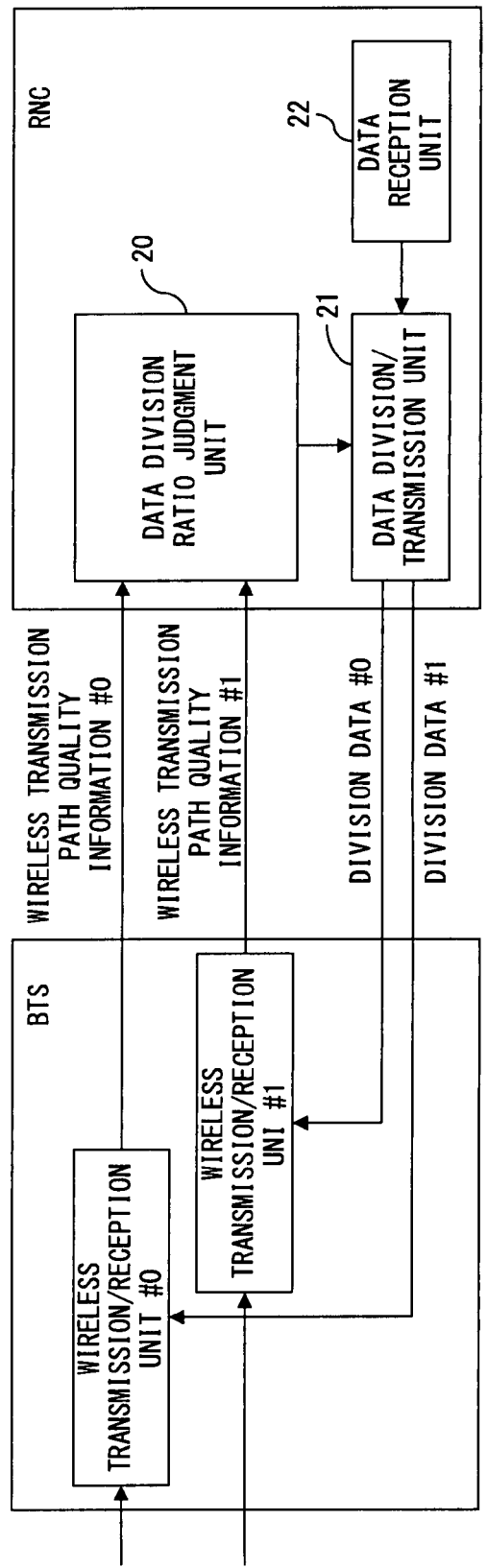
FIG. 18 is a diagram describing yet another preferred embodiment of the present invention.

FIG. 18 is a diagram describing yet another preferred embodiment of the present invention.

Having received wireless transmission path quality information #0 and #1, respectively, the wireless transmission/reception units #0 and #1 input these pieces of information to a data division ratio judgment unit 20 which in turn calculates a division ratio and inputs it to a data division/transmission unit 21. Having received the transmission data from a data reception unit 22, the data division/transmission unit 21 divides the data based on the obtained division ratio, and sends out the obtained division ratio and transmits the divided data #0 and #1 respectively to the wireless transmission/reception units #0 and #1 for being transmitted. This example is configured in a manner that the wireless transmission/reception units #0 and #1 are equipped in the base station BTS, while the data division ratio judgment unit 20, data division/transmission unit 21 and data reception unit 22 are equipped in the base station control apparatus RNC.

Note that the DHO process according to the above described embodiment is assumed to be carried out in the data division/transmission unit 21.

A conceivable method for obtaining wireless transmission path quality information is to use a transmission power control (TPC) which is control information used for an inner loop power control that is carried out between the base station and mobile terminal, also as being used for an international patent application number PCT/JP03/11270 and Japanese Patent Application 2004-571830. The present embodiment is configured to determine a distribution ratio of data to be transmitted based on a TPC obtained from each transmission path.

The mobile terminal instructs the base station for an increase or decrease of a transmission power by means of an inner loop power control. An instruction for an increase or decrease of a transmission power indicates a radio condition per se at the time. A data distribution judgment unit at the RNC obtains TPC information on all transmission paths from base stations BTS.

Having received the TPC information of individual transmission paths from the respective base station BTS, the data distribution ratio judgment unit 20 measures it for a predetermined time, calculates a distribution ratio of data to be transmitted to each transmission path (i.e., each base station BTS) based on the measurement result and notifies the data division/transmission unit 21 of the distribution ratio.

The data division/transmission unit 21 transmits data to each base station in accordance with the data distribution ratio notified from the data distribution ratio judgment unit 20.

The data distribution ratio judgment unit 20 judges the data distribution ratio based on the TPC information in the measurement cycle section. The TPC used here is assumed to be either of an Up instruction or Down instruction of a transmission power that is used for the current 3GPP system.

Specifically, the number of times indicating instructions for decreasing the power, among pieces of the TPC information collected for a certain period of time, is accumulated. A ratio of accumulated values at the respective base station BTS at the completion of a measurement period is determined to be a distribution ratio.

FIG. 19 is a diagram describing an example of a method for judging a distribution ratio of data.

The example shown in FIG. 19 indicates a power increase instruction by a circle (○) and a decrease instruction by x, and the number is 4 for BTS#0, and 8 for BTS#1, making the distribution ratio of BTS#0:BTS#1=1:2.

Another conceivable data distribution ratio judgment method is a method for determining a value, as a distribution ratio, multiplying a data distribution ratio at the current time by an accumulated value calculated at the completion of a measurement period.

FIG. 20 is a diagram describing another example of a method for judging a distribution ratio of data.

The example shown in FIG. 20 indicates a power increase instruction by a circle (○) and a decrease instruction by x, and the accumulated value is 4 and data distribution ratio is 2 for BTS#0, and the accumulated value is 8 and data distribution ratio is 1 for BTS#1, making the distribution ratio of BTS#0: BTS#1=1:1.

As described above, the data distribution ratio judgment unit 20 needs to know a distribution ratio at the current time. The data distribution ratio judgment unit 20 may store the previous value or requests the data division/transmission unit 21 for a notification.

The above described distribution ratio calculated at the data distribution ratio judgment unit 20 may conceivably be corrected depending on a situation. The conceivable correction methods are as follows:

(1) Increase by a certain volume for a transmission path with a presently large distribution ratio (2) Increase by a certain volume for a transmission path with a presently small distribution ratio (3) Apply a correction in accordance with a limit of the division method at the data division/transmission unit 21

(4) Give an initial value to a transmission path without a present distribution ratio immediately after a handover (only in the case of the method shown in FIG. 20)

(5) Give a limit to a data distribution ratio (6) If a share has been allocated to a deletion subject transmission path at the time of data distribution after deleting a transmission path, allocate in priority to the best transmission path First, as for the method (1), a transmission path with a presently large distribution ratio has a high radio quality highly possibly and therefore a large weight is given to a transmission path with a possible high quality. The weighting may be implemented by multiplying a factor of certain amount or adding a certain amount.

Next, as for the method (2), a transmission path with a presently small distribution ratio may possibly be immediately after a transmission path is added for a handover, or a distribution ratio is lowered due to a temporary change of a radio condition. Furthermore, it is possible to suppress (i.e., alleviate) an inclination of a data distribution ratio to a transmission path with a large data volume.

Figure 21:
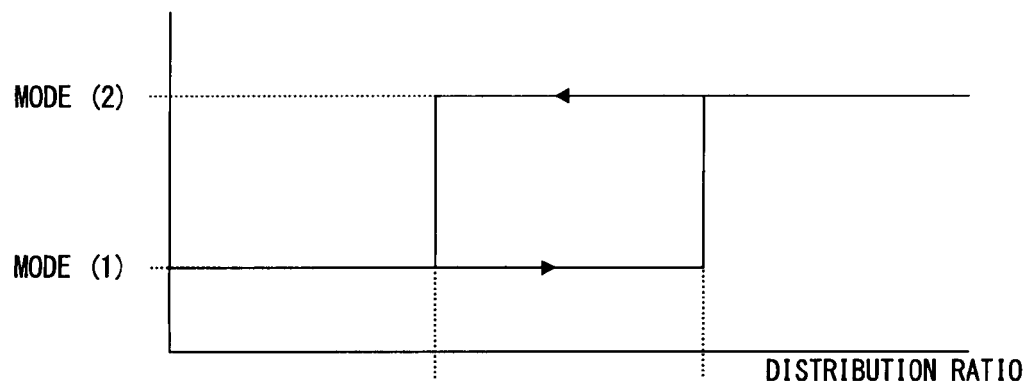
FIG. 21 is a diagram showing a concept of a mode changeover.

Conceivable here is a co-use of the methods (1) and (2). That is, to change over to a mode of the (1) or (2) if an eventually calculated distribution ratio becomes a certain value. FIG. 21 is a diagram showing a concept of a mode changeover, providing a concept of configuration in which a threshold value for changing over from the mode (1) to (2) and that for changing over from the mode (2) to (1) are determined to be different distribution ratio so as to form a hysteresis.

As for the method (3), it is conceivably necessary because there is possibly a limit in a division method at the data division/transmission unit 21. As an example, if a division method of ½, ¼, ⅛ or so on is adopted as a division method for certain data, a division ratio possibly generated by the division method needs to be calculated. Therefore, the calculated value is applied by a round-off or half adjust.

As for the method (4), an added transmission path does not have an initial value because there is no previous value immediately after carrying out a handover. Therefore, the data division/transmission unit 21 is requested to notify a ratio that is already divided thereat and the ratio is accordingly used.

As for the method (5), a limit is given to a data distribution ratio. As an example, if the minimum value of a divided pattern is one tenth (1/10) in the state of three transmission paths existing, the allocation of 1/10 is still carried out even if the quality of a certain transmission path, among the three transmission paths, turns very bad. This is because of a definition: "the judgment of transmitting no data to a certain transmission path depends on a deletion of a transmission path due to the judgment that it is a transmission path unable to obtain a DHO effect". The data distribution ratio judgment unit 20 judges that it is a transmission path capable of obtaining a DHO effect as long as the transmission path exists, and transmits divided data of a minimum unit no matter how the transmission path quality is in inferior state. This, however, largely depends on the minimum unit of a data division. As an example, it is conceivable to provide a transmission path in which no data is transmitted in the state of the minimum unit of data division being one half (½) or such, in lieu of applying the aforementioned method.

Figure 22:
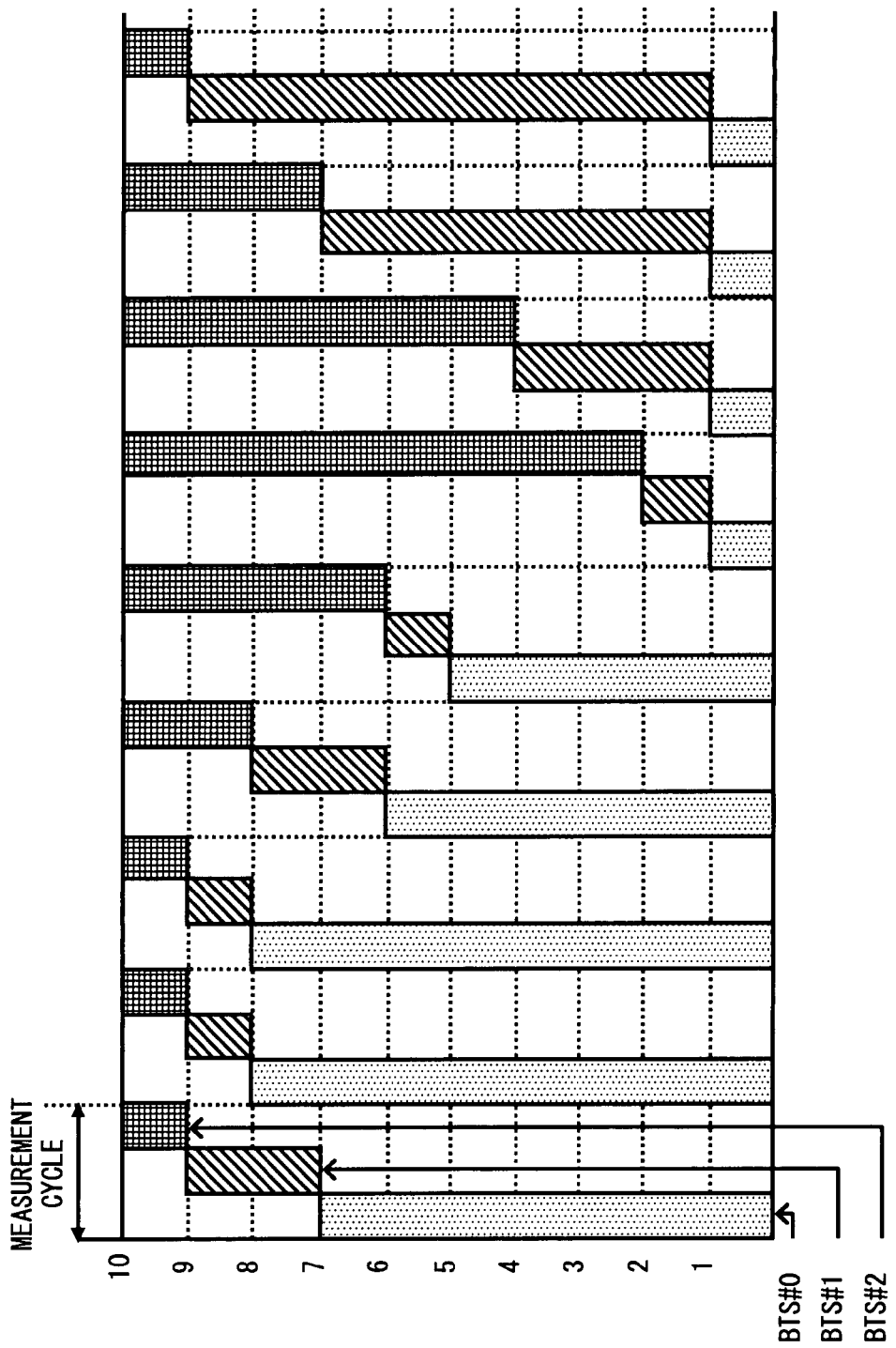
FIG. 22 is a diagram of an operation image of a change in a distribution ratio.

FIG. 22 is a diagram of an operation image of a change in a distribution ratio. A transmission path state is obtained per measurement cycle and a distribution ratio for a base station BTS, which transmits data to each transmission path, is calculated. FIG. 22 shows how the ratio among BTS#0, BTS#1 and BTS#2 is changed for each measurement cycle.

As for the method (6), if a data transmission distribution is allocated to a transmission path as a subject of deletion when the transmission path is judged to be incapable of obtaining a DHO effect, followed by being deleted, the allocated value is added to a transmission path with the best quality at the time of deleting the transmission path.

FIG. 23 is a diagram showing a situation of allocating a distribution value of a transmission path as a subject of deletion. In the cycle 1, the BTS#0 through BTS#2 transmit data respectively, while in the cycle 2, the transmission quality of the BTS#2 is degraded and the transmission path of the BTS#0 is the best, and therefore the BTS#2 is deleted and the share is allocated to the BTS#0.

A method for measuring a transmission quality can also consider a utilization of a data quality of uplink data. In a Frequency Division Duplex (FDD) system, however, it is not possible to read uplink radio quality information as being similar to a downlink radio quality because a radio frequency used for the uplink is different from one used for the downlink, and therefore an error is generated in a measurement of a transmission quality; a usage of this method is possible, however. In the case of the OFDM system, this is a technique capable of suppressing an influence of a frequency selective fading, and therefore a difference of quality between the uplink and downlink is deemed to be very small even if the FDD system is used, thus conceivably creating little problem if an uplink data quality is used for measuring a transmission quality.

In the case of a Time Division Duplex (TDD) system, a frequency used for the uplink and downlink is the same and therefore a use of the uplink data quality for measuring a transmission quality conceivably makes it possible to provide good accuracy.

The uplink data can use a bit error rate (BER) and a block error rate (BLER) in the case of carrying out an error correction coding/decoding for transmitting and receiving user data in a radio section. Furthermore, there is also a choice of using a BER in radio control data.

In the DHO system according to the preferred embodiment of the present invention, however, a result of applying an error correction decoding to user data does not necessarily have to be good. That is, even data not succeeding in an error correction in the respective wireless transmission path has no problem provided that an eventual error correction result, as a result of collecting data from the entirety of wireless transmission paths, is good.

As for radio control data, a reception of normal control data must be possible in each wireless transmission path, and therefore described in the following is a method for utilizing quality information for the control data.

Means for a BTS notifying an RNC of quality of radio control data exists also in the 3GPP. In the 3GPP, an area (QE) for storing quality information exists in a data transmission format between the BTS and RNC. The QE stores quality (i.e., a transport channel BER) obtained as a result of an error correction of user data at the time of transmitting the user data, while stores quality (i.e., a physical channel BER) if there is no user data. A selection of either one of these is possible by selecting by a QE selector. Therefore, when applying the present invention to the 3GPP, the QE selector is set to "non-selected" (i.e., a physical channel BER is selected).

Here, a measurement section of the transport channel (TrCH) is a Transmission Time Interval (TTI) cycle of a TrCH. A reported TrCH BER measurement value is an average value of a BER in a measurement interval and a measurement subject is a Dedicated Physical Data CHannel (DPDCH). A measurement section of the physical channel BER is the TTI of a TrCH, of which a Phy PER is one becoming valid through an IE "QE-selector" of C-Plane which is shown in the TS25.433. A measurement of respectively reported Phy BER is an average of BER in a measurement section, and the measurement target is a Dedicated Physical Control CHannel (DPCCH).

A data division ratio judgment is similar to the case of utilizing a TPC. In the case of the TPC, calculated is a ratio of Down information of the TPC in each transmission path, whereas an inverse of a data error rate is taken in the case of using a Physical Channel BER. FIG. 24 is a diagram exemplifying a data division ratio judgment method, in which the case of FIG. 24 (a) obtains a bit error rate BER for the base stations BTS #0 and #1 of the respective transmission paths, and determines a distribution ratio in proportionate with the inverse of the BER. FIG. 24 (b) shows a method of multiplying the inverse of the bit error rate BER by the current distribution ratio and making the ratio a new ratio.

A correction process of a distribution ratio in the case of using a BER is similar to the case of using a TPC and therefore a description is omitted here.

Figure 25:
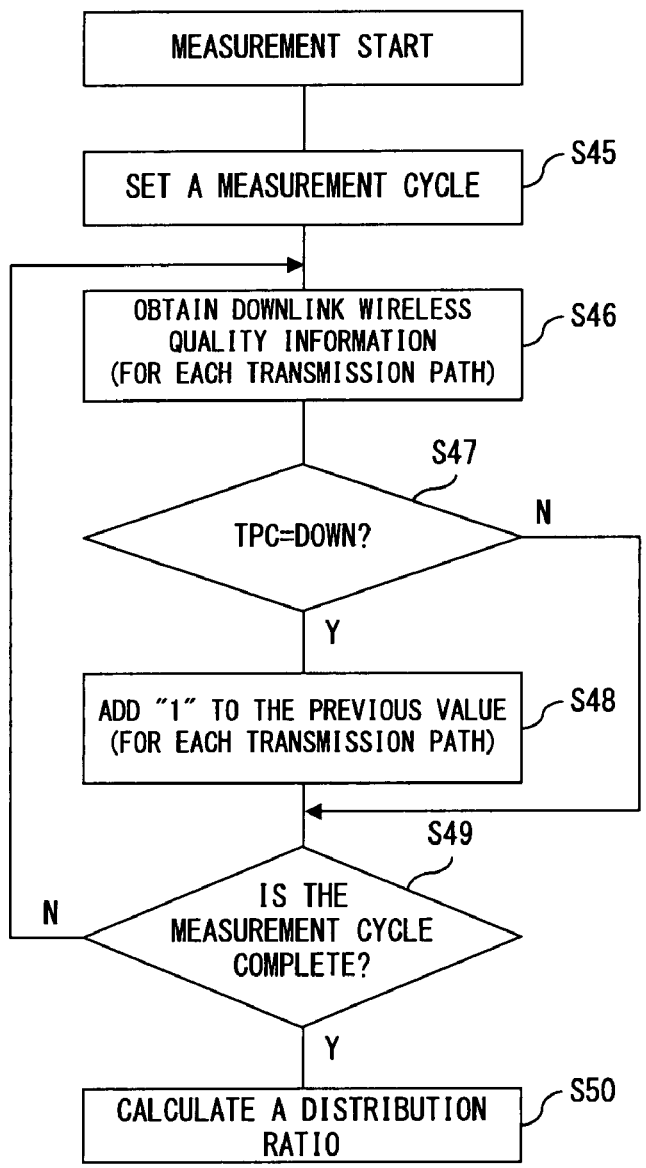
FIG. 25 is a flow chart exemplifying a process for calculating a distribution ratio (part 1)
Figure 26:
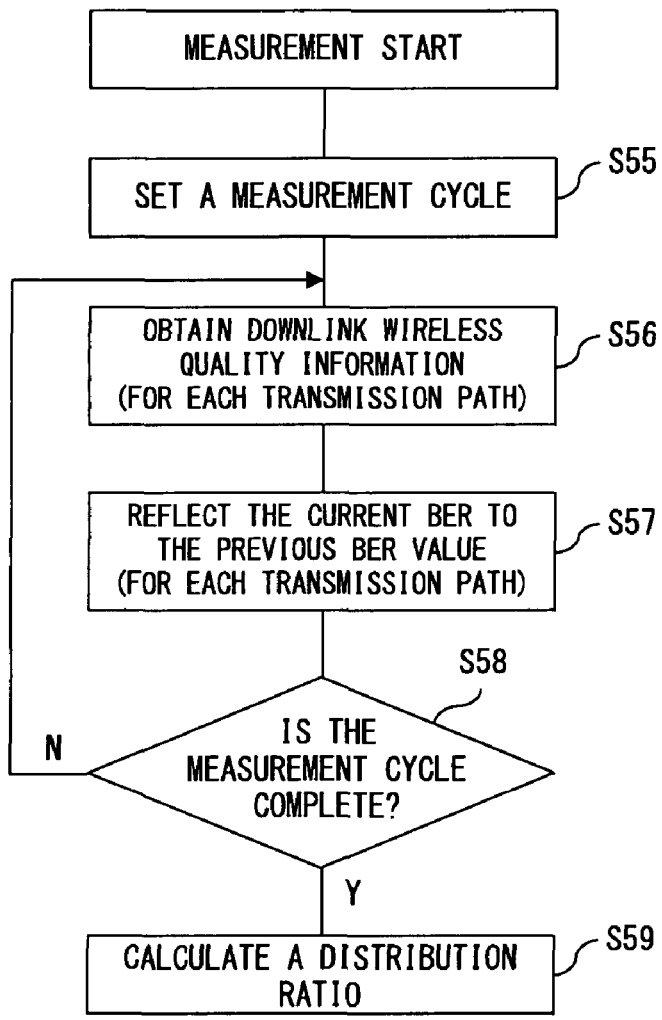
FIG. 26 is a flow chart exemplifying a process for calculating a distribution ratio (part 2)

FIGS. 25 and 26 show a flow chart exemplifying a process for calculating a distribution ratio.

FIG. 25 is a process flow in the case of using a TPC.

In S45, a measurement cycle is set, followed by downlink wireless quality information being obtained for each transmission path in S46. Judged in S47 is whether or not the TPC is a decrease instruction. If the judgment of the S47 is "no", the process proceeds to S49. If the judgment of the S47 is "yes", the previous count value for each transmission path is added by "1" in S48 and the process proceeds to the S49. Then, judged in the S49 is whether or not the measurement cycle is complete. If the judgment of the S49 is "no", the process proceeds to S46. If the judgment of the S49 is "yes", a distribution ratio is calculated in S50.

FIG. 26 is a process flow in the case of using a BER.

In S55, a measurement cycle is set, followed by downlink wireless quality information being obtained for each transmission path in S56, the current BER value being reflected to the previous BER value for each transmission path in S57, and judged as to whether or not the measurement cycle is complete in S58. If the judgment of the S58 is "no", the process proceeds to the S56. If the judgment of the S58 is "yes", a distribution ratio is calculated in S59.

The distribution ratio judgment method according to the above described embodiment is configured to have a measurement cycle and carry out a judgment of quality of data at every time of receiving it within the time period; a conceivable method, however, is to give a weighting to the judgment.

As an example, if the number of time of data reception is defined as a measurement cycle, more emphasis is placed on the quality condition at immediately before the end of a measurement as opposed to the measurement start. FIG. 27 shows a judgment example in the case of the number of time of data reception given as a measurement cycle being ten (10).

The weight given in this event is configured to set in a manner that the weight increases 0.1 with the number of times in the example of FIG. 27 (N.B.: the set weight may be arbitrary. As an example, it is possible to set in a manner that the weight increases exponentially or set a range of increasing a weight as "0" through "1" at the time of increasing the TPC and as "1" at the time of decreasing the TPC).

Moreover, if a quality condition is good (i.e., if the TPC is on the decrease), "1" is used, and if the quality condition is bad (i.e., if the TPC is on the increase), "0" is used (N.B., the quality information may use the BER or such, in place of the TPC). A value as a result of multiplying the aforementioned value by a given weighting is accumulated for the amount of the measurement cycle. This results in the distribution ratio between the BTS #0 and #1 being 1:4 in the example of FIG. 27.

Furthermore, information, as obtained quality information, equivalent to a volume worth a measurement cycle may conceivably be obtained at once from each transmission path, and therefore, a distribution ratio is calculated on the basis of the information in such event.

Figure 28:
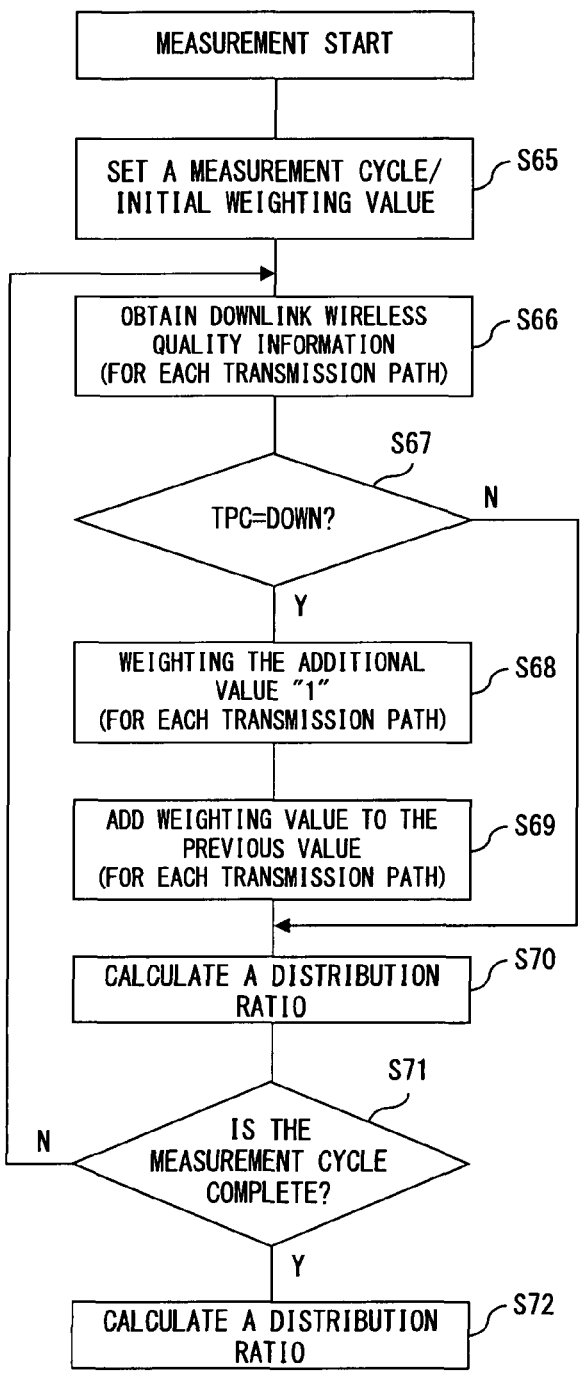
FIG. 28 is a process flow according to another example of a distribution ratio calculation method (part 1)
Figure 29:
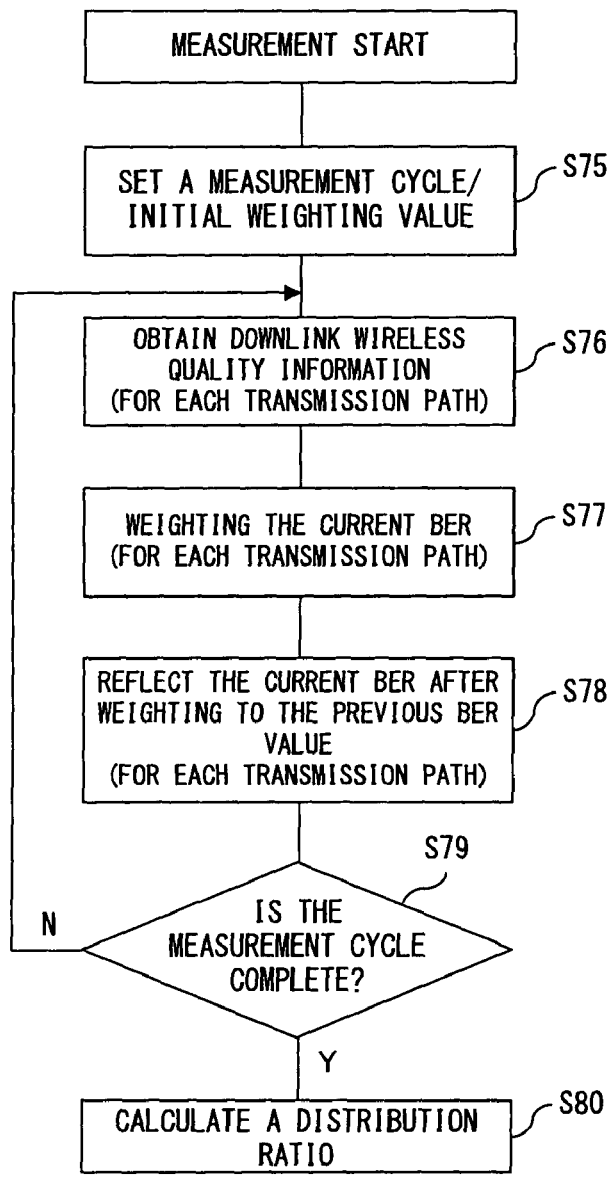
FIG. 29 is a process flow according to another example of a distribution ratio calculation method (part 2).

FIGS. 28 and 29 show a process flow according to another example of a distribution ratio calculation method.

FIG. 28 is a flow chart showing a process in the case of using a TPC for calculating a distribution ratio.

In S65, performed is a setup of a measurement cycle/initial weighting value. Downlink wireless quality information is obtained for each transmission path in S66. Then judged in S67 is whether or not a TPC is an instruction for a decrease. If the judgment of the S67 is "no", the process proceeds to S70. If the judgment of the S67 is "yes", the previous additional value, that is, "1", for each transmission path is multiplied by a weight value in S68. A value as a result of weighting the previous additional value is added to the previous additional value in S69 and the next weighting value is calculated in S70. Then judged in S71 is whether or not the measurement cycle is complete. If the judgment of the S71 is "no", the process proceed to the S66. If the judgment of the S71 is "yes", a distribution ratio is calculated in S72.

FIG. 29 is a flow chart showing a process in the case of using a BER for calculating a distribution ratio.

In S75, a measurement cycle/initial weighting value is set. Downlink wireless quality information is obtained for each transmission path in S76. Weighting of the current BER is performed for each transmission path in S77. The current BER after weighting is reflected to the previous BER value for each transmission path in S78. Then, judged in S79 is whether or not the measurement cycle is complete. If the judgment of the S79 is "no", the process returns to the S76. If the judgment of the S79 is "yes", a distribution ratio is calculated in S80.

The above described preferred embodiment of the present invention is configured to transmit data distributedly based on a radio transmission quality, resulting in a large amount of data flowing in a transmission path with a good quality, thereby enabling an effective data telecommunication in accordance with a transmission path condition.

Furthermore, it is configured to avoid an ill influence to another user as compared to a method of transmitting the same data as a DHO method applied to the current 3GPP system because a transmission path with a bad transmission quality conceivably takes up a lot of wireless resources.

What is claimed is:

1. A telecommunication system in which wireless apparatuses communicate with each other, comprising:
   an error correction coding unit for applying an error correction coding to data to be transmitted;
   an interleave unit for applying an interleaving to the error correction-coded data;
   a division unit for dividing the interleaved data;
   a transmission unit for transmitting the divided pieces of data through respectively different wireless transmission paths; and
   a variable division unit for varying a division ratio of data being divided corresponding to individual wireless apparatuses using a transmission quality of the respective wireless apparatuses.

2. The telecommunication system according to claim 1, further comprising:
   a generating unit generating division numbers for indicating the sequence of divided pieces of data when dividing the data; and
   a combining unit combining the divided pieces of data by referring to the division numbers when a reception side combines the divided data.

3. The telecommunication system according to claim 2, wherein
   said division numbers are included in a header of the divided pieces of data.

4. The telecommunication system according to claim 2, wherein
   said division numbers are set to control information transmitted in a different channel together with the divided pieces of data.

5. The telecommunication system according to claim 1, wherein
   the transmitting unit transmits the divided data to a wireless apparatus in such a manner that a combination sequence of data is correlated with the wireless apparatus to which data is transmitted and that a sequence of combining the divided data is correct when transmitting the divided data.

6. The telecommunication system according to claim 1, further comprising:
   a retransmission unit for retransmitting the divided pieces of data, of which a transmission is failed, by employing a wireless apparatus that has succeeded in transmission in accordance with a request from a reception side.

7. The telecommunication system according to claim 6, wherein
   a wireless apparatus that is used for transmitting retransmitted divided data is a wireless apparatus of which a transmission quality is the best.

8. The telecommunication system according to claim 1, wherein
   said transmission quality is that of the wireless apparatus in a forward direction of a direction of transmitting the divided pieces of data.

9. The telecommunication system according to claim 8, wherein
   said transmission quality is obtained on the basis of transmission power control (TPC) information from a reception side.

10. The telecommunication system according to claim 9, wherein
    said division ratio is calculated by collecting power decrease instruction information included in a TPC.

11. The telecommunication system according to claim 1, wherein
    said transmission quality is that of the wireless apparatus in a reverse direction to a direction of transmitting the divided pieces of data.

12. The telecommunication system according to claim 11, wherein said transmission quality is obtainable on the basis of a bit error rate (BER) of a signal for a transmission side receiving from a reception side.

13. The telecommunication system according to claim 12, wherein
said division ratio is calculated by collecting an inverse of a BER.

14. The telecommunication system according to claim 1, wherein
a division ratio which used to be allocated to a deleted wireless apparatus is reallocated to a wireless apparatus of which a transmission quality is the best when a wireless apparatus is deleted.

15. A transmission method between wireless apparatuses, comprising:
applying an error correction coding to data to be transmitted;
applying an interleaving to the error correction-coded data;
dividing the interleaved data;
transmitting the divided pieces of data through respectively different wireless transmission paths; and
varying a division ratio of data being divided corresponding to individual wireless apparatuses based on a transmission quality of the respective wireless apparatuses.

16. A telecommunication system in which wireless apparatuses communicate with each other, comprising:
an error correction coding unit to apply an error correction coding to data to be transmitted;
an interleave unit to apply an interleaving to the error correction-coded data;
a division unit to divide the interleaved data so as not to have an overlapped part or so as to have an overlapped part;
a transmission unit to transmit the divided pieces of data by way of a first and a second wireless transmission paths, respectively, which are utilized for a soft handover; and
a variable division unit to vary a division ratio of data being divided corresponding to individual wireless apparatuses based on a transmission quality of the respective wireless apparatuses.

17. The transmission method of claim 15, further comprising:
generating division numbers for indicating a sequence of the divided pieces of data when dividing the data; and
combining the divided pieces of data by referring to the division numbers when a reception side combines the divided data.

18. The transmission method of claim 17, further comprising:
setting said division numbers in a header of the divided pieces of data.

19. The transmission method of claim 18, wherein
the setting includes setting said division number to control information transmitted in a different channel together with the divided pieces of data.

20. The transmission method of claim 15, wherein
said transmission quality is obtained on the basis of transmission power control (TPC) information from a reception side.

* * * * *